US008928773B2

(12) United States Patent
Yamada et al.

(10) Patent No.: US 8,928,773 B2
(45) Date of Patent: Jan. 6, 2015

(54) IMAGE PICKUP UNIT AND IMAGE PICKUP DISPLAY SYSTEM

(71) Applicant: Sony Corporation, Tokyo (JP)

(72) Inventors: Yasuhiro Yamada, Kanagawa (JP); Tsutomu Tanaka, Kanagawa (JP); Michiru Senda, Kanagawa (JP)

(73) Assignee: Sony Corporation, Tokyo (JP)

( * ) Notice: Subject to any disclaimer, the term of this patent is extended or adjusted under 35 U.S.C. 154(b) by 161 days.

(21) Appl. No.: 13/650,799

(22) Filed: Oct. 12, 2012

(65) Prior Publication Data
US 2013/0100330 A1    Apr. 25, 2013

(30) Foreign Application Priority Data

Oct. 21, 2011    (JP) .................................. 2011-231768

(51) Int. Cl.
| | | |
|---|---|---|
| H04N 5/235 | (2006.01) | |
| H04N 5/217 | (2011.01) | |
| H01L 27/146 | (2006.01) | |
| H04N 5/32 | (2006.01) | |
| H04N 5/363 | (2011.01) | |
| H04N 5/378 | (2011.01) | |

(52) U.S. Cl.
CPC ................. *H04N 5/32* (2013.01); *H04N 5/363* (2013.01); *H04N 5/378* (2013.01)
USPC .................... 348/222.1; 348/241; 250/370.09

(58) Field of Classification Search
CPC .......... H04N 5/32; H04N 5/363; H04N 5/378
USPC ......................... 348/222.1, 241–243, 333.01; 250/208.1, 366, 370.09
See application file for complete search history.

(56) References Cited

U.S. PATENT DOCUMENTS

| | | | |
|---|---|---|---|
| 2006/0180774 A1* | 8/2006 | Endo ........................ | 250/485.1 |
| 2008/0151091 A1* | 6/2008 | Hynecek .................... | 348/308 |
| 2009/0128677 A1* | 5/2009 | Kozlowski ................. | 348/308 |
| 2011/0144835 A1* | 6/2011 | Ho ............................. | 701/13 |

FOREIGN PATENT DOCUMENTS

JP    2011-135561 A    7/2011

* cited by examiner

*Primary Examiner* — Trung Diep
(74) *Attorney, Agent, or Firm* — Wolf, Greenfield & Sacks, P.C.

(57) ABSTRACT

An image pickup unit includes: an image pickup section including a plurality of pixels, the pixels each including a photoelectric transducer and a field-effect transistor; and a drive section switching the transistor between an on operation and an off operation to perform a read operation and a reset operation of a signal charge accumulated in each of the pixels. The transistor includes a first gate electrode and a second gate electrode with a semiconductor layer in between, the drive section applies a first voltage and a second voltage to the first gate electrode and the second gate electrode of the transistor, respectively, to switch the transistor between the on operation and the off operation, and the drive section adjusts timings of switching the first and second voltages between an on-voltage and an off-voltage, on-voltage values of the first and second voltages, or both thereof to be different from each other.

19 Claims, 34 Drawing Sheets

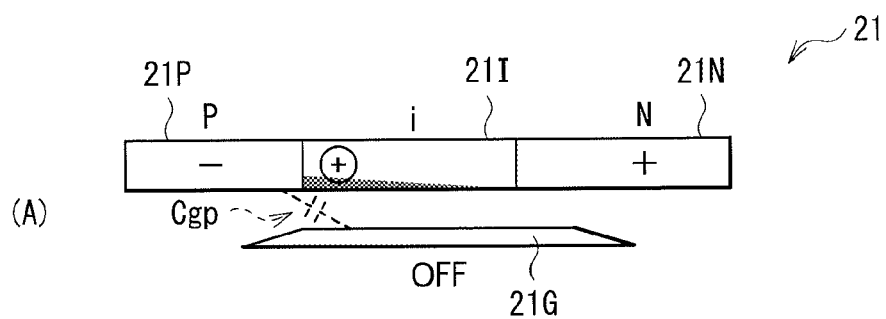
(A) ACCUMULATION MODE (Cgp=LARGE)
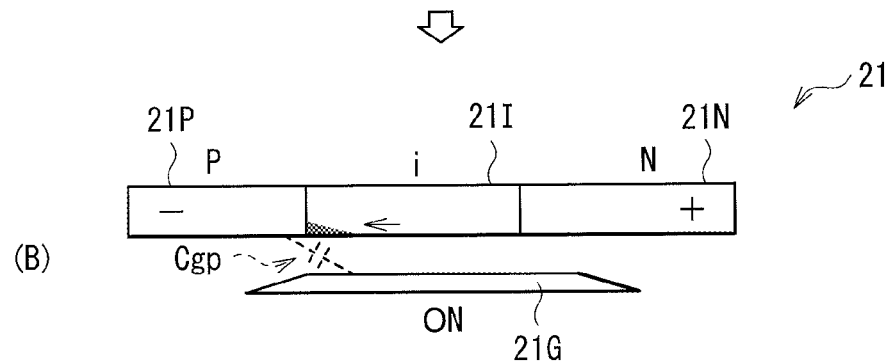
(B) DEPLETION MODE (Cgp=SMALL)
FIG. 8

SECOND RESET PERIOD Tr2 (FIRST OPERATION EXAMPLE)

SECOND RESET PERIOD Tr2 (SECOND OPERATION EXAMPLE)

IMAGE PICKUP UNIT AND IMAGE PICKUP DISPLAY SYSTEM

BACKGROUND

The present disclosure relates to an image pickup unit including a photoelectric transducer, and an image pickup display system including such an image pickup unit.

In related art, various image pickup units including photoelectric transducers embedded in respective pixels (image pickup pixels) have been proposed. Examples of such image pickup units including the photoelectric transducers include so-called optical touch panels and radiation image pickup units (for example, refer to Japanese Unexamined Patent Application Publication No. 2011-135561).

SUMMARY

In the above-described image pickup units, typically, image pickup data is acquired by performing a read operation and a reset operation of a signal charge on a plurality of pixels. However, the reset operation causes noise in an output signal, thereby causing degradation in image quality of a picked-up image.

It is desirable to provide an image pickup unit capable of achieving higher image quality of a picked-up image, and an image pickup display system including such an image pickup unit.

According to an embodiment of the disclosure, there is provided an image pickup unit including: an image pickup section including a plurality of pixels, the pixels each including a photoelectric transducer and a field-effect transistor; and a drive section switching the transistor between an on operation and an off operation to perform a read operation and a reset operation of a signal charge accumulated in each of the pixels, in which the transistor includes a first gate electrode and a second gate electrode with a semiconductor layer in between, the drive section applies a first voltage and a second voltage to the first gate electrode and the second gate electrode of the transistor, respectively, to switch the transistor between the on operation and the off operation, and the drive section adjusts timings of switching the first and second voltages between an on-voltage and an off-voltage, on-voltage values of the first and second voltages, or both thereof to be different from each other.

According to an embodiment of the disclosure, there is provided an image pickup display system including an image pickup unit, and a display unit displaying an image based on an image pickup signal acquired by the image pickup unit, the image pickup unit including: an image pickup section including a plurality of pixels, the pixels each including a photoelectric transducer and a field-effect transistor; and a drive section switching the transistor between an on operation and an off operation to perform a read operation and a reset operation of a signal charge accumulated in each of the pixels, in which the transistor includes a first gate electrode and a second gate electrode with a semiconductor layer in between, the drive section applies a first voltage and a second voltage to the first gate electrode and the second gate electrode of the transistor, respectively, to switch the transistor between the on operation and the off operation, and the drive section adjusts timings of switching the first and second voltages between an on-voltage and an off-voltage, on-voltage values of the first and second voltages, or both thereof to be different from each other.

In the image pickup unit and the image pickup display system according to the embodiments of the disclosure, photoelectric conversion based on incident light is performed in each pixel of the image pickup section, and the read operation and the reset operation of the signal charge are performed to acquire a picked-up image based on the incident light. The drive section applies the first voltage and the second voltage to the first gate electrode and the second electrode of the transistor, respectively, in the read operation and the reset operation, and adjusts timings of switching the first and second voltages between the on-voltage and the off-voltage, on-voltage values of the first and second voltage, or both thereof to be different from each other in the reset operation. Accordingly, so-called charge injection caused by switching the transistor from the on operation to the off operation in the reset operation is reduced.

In the image pickup unit and the image pickup display system according to the embodiments of the disclosure, each pixel of the image pickup section includes a photoelectric transducer, and the drive section performs the read operation and the reset operation of a signal charge from each pixel to acquire a picked-up image based on incident light. The drive section performs switching of the transistor between the on operation and the off operation while adjusting timings of switching the first and second voltages between the on-voltage and the off-voltage, on-voltage values of the first and second voltages, or both thereof to be different from each other in the reset operation; therefore, charge injection caused by the switching is reduced. Thus, higher image quality of a picked-up image is achievable.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the technology, and are incorporated in and constitute a part of this specification.

The drawings illustrate embodiments and, together with the specification, serve to explain the principles of the technology.

FIG. 8 is a schematic view for describing an accumulation mode and a depletion mode of a lateral PIN photodiode, where a part (A) illustrates the accumulation mode, and a part (B) illustrates the depletion mode.

DETAILED DESCRIPTION

A preferred embodiment of the disclosure will be described in detail below referring to the accompanying drawings. It is to be noted that description will be given in the following order.

1. Embodiment (An example of an image pickup unit performing a reset operation while maintaining two gate voltage pulses, one at an on-potential and the other at an off-potential)

2. Modification 1 (An example in which a timing of switching one of the voltage pulses is earlier)

3. Modification 2 (An example in which an amplitude (an on-potential value) of one of voltage pulses is smaller)

4. Modification 3 (An example in which a timing of switching one of the voltage pulses is earlier and the amplitude of the one of the voltage pulses is smaller)

5. Modification 4 (An example in which a timing of switching is earlier in a first reset operation)

6. Modification 5 (An example in which one gate electrode overlaps an LDD layer)

7. Modification 6 (Another example of a passive pixel circuit)

8. Modification 7 (Still another example of the passive pixel circuit)

9. Modifications 8 and 9 (Examples of an active pixel circuit)

10. Modifications 10 and 11 (Examples of an image pickup section performing image pickup based on a radiation ray)

12. Application Example (An example of application to an image pickup display system)

(Embodiment)

[Entire Configuration of Image Pickup Unit 1]

Figure 1:
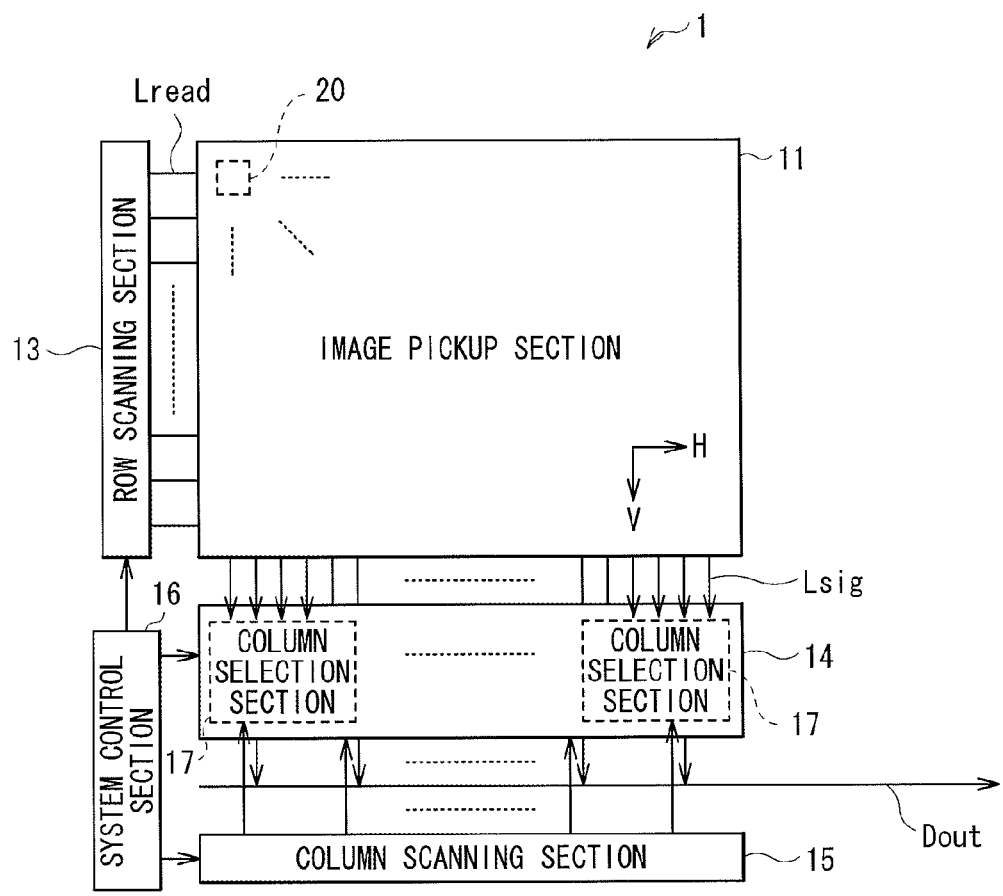
FIG. 1 is a block diagram illustrating an entire configuration example of an image pickup unit according to an embodiment of the disclosure.

FIG. 1 illustrates an entire block configuration of an image pickup unit (an image pickup unit 1) according to an embodiment of the disclosure. The image pickup unit 1 reads information of an object (picks up an image of an object), based on incident light (image pickup light). The image pickup unit 1 includes an image pickup section 11, a row scanning section 13, an A/D conversion section 14, a column scanning section 15, and a system control section 16. The row scanning section 13, the A/D conversion section 14, the column scanning section 15, and the system control section 16 correspond to specific but not limitative examples of "drive section" in the disclosure.

(Image Pickup Section 11)

The image pickup section 11 generates an electrical signal based on incident light (image pickup light). In the image pickup section 11, pixels (image pickup pixels, unit pixels) 20 are two-dimensionally arranged in a matrix form, and each include a photoelectric transducer (a photoelectric transducer 21 which will be described later) generating a photoinduced charge with a charge amount corresponding to a light amount of image pickup light, and accumulating the charge therein. It is to be noted that, as illustrated in FIG. 1, a horizontal direction (a row direction) and a vertical direction (a column direction) in the image pickup section 11 are referred to as "H" direction and "V" direction, respectively.

Figure 2:
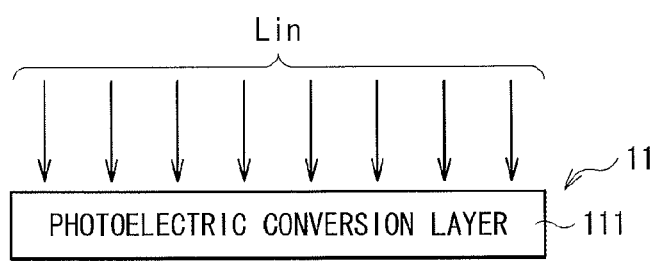
FIG. 2 is a schematic view illustrating a schematic configuration example of an image pickup section illustrated in FIG. 1.

FIG. 2 is a schematic configuration example of the image pickup section 11. The image pickup section 11 includes a photoelectric conversion layer 111 where photoelectric transducers 21 corresponding to respective pixels 20 are disposed. In the photoelectric conversion layer 111, as illustrated in the drawing, photoelectric conversion based on incident image pickup light Lin (conversion from the image pickup light Lin to a signal charge) is performed.

Figure 3:
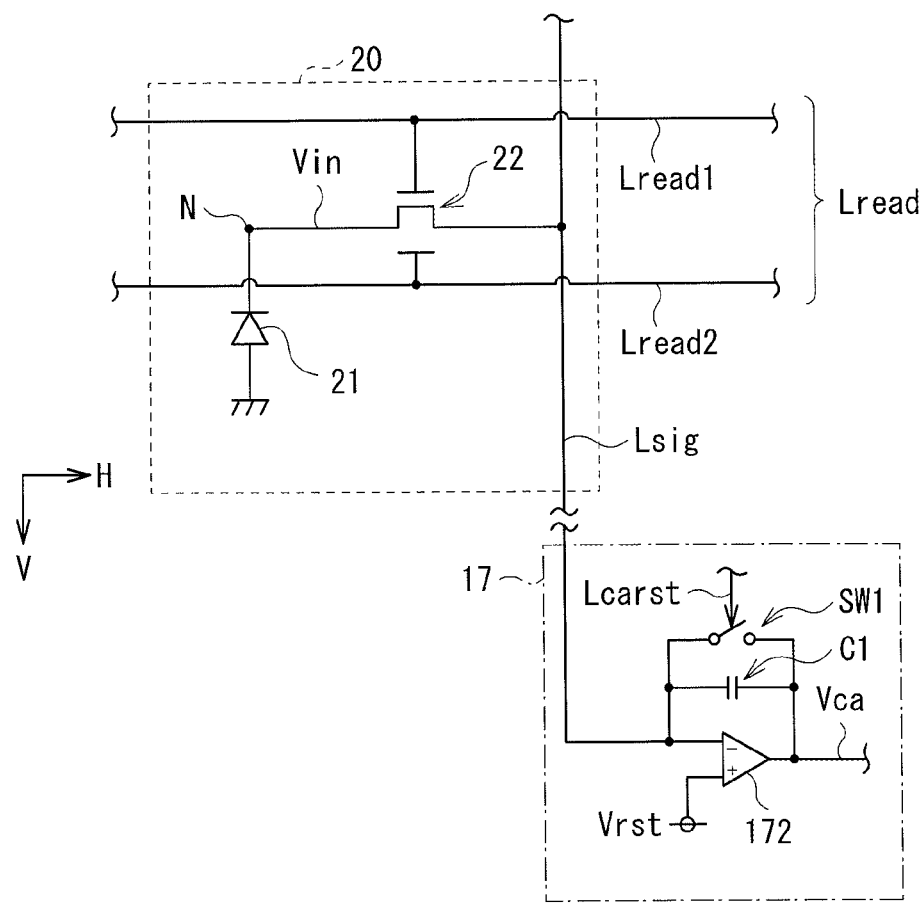
FIG. 3 is a circuit diagram illustrating a specific configuration example of a pixel and the like illustrated in FIG. 1.

FIG. 3 illustrates a circuit structure of the pixel 20 (a so-called passive circuit structure) with a circuit structure of a column selection section 17 which will be described later in the A/D conversion section 14. The passive pixel 20 includes one photoelectric transducer 21 and one transistor 22. The pixel 20 is connected to read control lines Lread (more specifically, two read control lines Lread1 and Lread2 which will be described later) extending along the H direction and a signal line Lsig extending along the V direction.

The photoelectric transducer 21 is configured of, for example, a PIN (Positive Intrinsic Negative) photodiode or an MIS (Metal-Insulator-Semiconductor) sensor, and generates a signal charge with a charge amount corresponding to the light amount of incident light (the image pickup light Lin), as described above. It is to be noted that, in this case, a cathode of the photoelectric transducer 21 is connected to a storage node N.

The transistor 22 is a transistor (a read transistor) switched into an on state based on row scanning signals supplied from the read control lines Lread to output a signal charge (an input voltage Vin) obtained by the photoelectric transducer 21 to the signal line Lsig. The transistor 22 is configured of an N-channel (N-type) field-effect transistor (FET). Alternatively, the transistor 22 may be configured of a P-channel (P-type) FET, or the like.

In the embodiment, the transistor 22 has a so-called dual-gate structure including two gates (a first gate electrode 220A and a second gate electrode 220B which will be described later) with a semiconductor layer (a semiconductor layer 226 which will be described later) in between.

Figure 4:
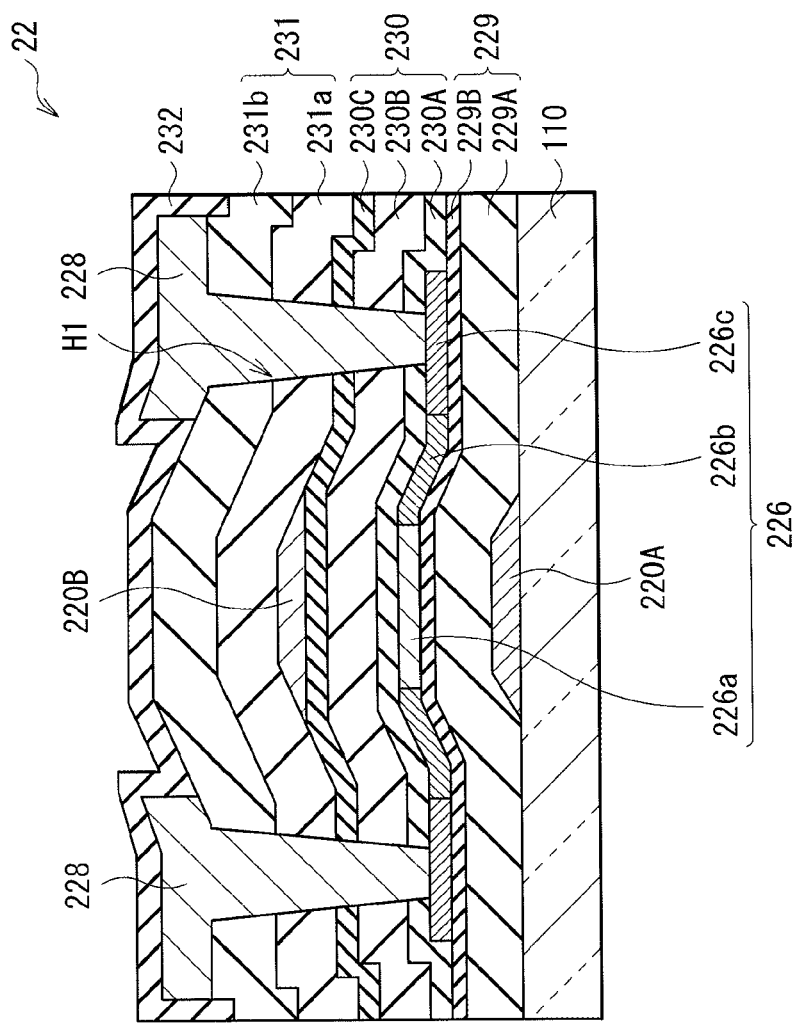
FIG. 4 is a sectional view illustrating a schematic configuration of a transistor illustrated in FIG. 3.

FIG. 4 illustrates a sectional configuration of the transistor 22. The transistor 22 includes the first gate electrode 220A and a first gate insulating film 229 formed to cover the first gate electrode 220A on a substrate 110. A semiconductor layer 226 including a channel layer (an active layer) 226a, an LDD (Lightly Doped Drain) layer 226b, and an N+ layer 226c is disposed on the first gate insulating film 229. A second gate insulating film 230 is formed to cover the semiconductor layer 226, and the second gate electrode 220B is disposed in a region facing the first gate electrode 220A on the second gate insulating film 230. A first interlayer insulating film 231 having contact holes H1 is formed on the second gate electrode 220B, and source-drain electrodes 228 are formed to fill in the contact holes H1. A second interlayer insulating film 232 is disposed on the first interlayer insulating film 231 and the source-drain electrodes 228.

The first gate electrode 220A and the second gate electrode 220B each are configured of a single-layer film made of one of Ti, Al, Mo, W, Cr, and the like, or a laminate film made of them. The first gate electrode 220A and the second gate electrode 220B are disposed to face each other with the first gate insulating film 229, the semiconductor layer 226, and the second gate insulating film 230 in between, as described above.

The first gate insulating film 229 and the second gate insulating film 230 each are a single-layer film such as a silicon oxide ($SiO_2$) film or a silicon oxynitride (SiON) film, or a laminate film including such a silicon compound film and a silicon nitride ($SiN_x$) film. For example, the first gate insulating film 229 is formed through laminating a silicon nitride film 229A and a silicon oxide film 229B in order from a side closer to the substrate 110, and the second gate insulating film 230 is formed through laminating a silicon oxide film 230A, a silicon nitride film 230B, and a silicon oxide film 230C in order from the side closer to the substrate 110.

The semiconductor layer 226 is formed with use of a silicon-based semiconductor such as amorphous silicon, microcrystalline silicon, or polycrystalline silicon (polysilicon). Alternatively, the semiconductor layer 26 may be formed with use of an oxide semiconductor such as indium gallium zinc oxide (InGaZnO) or zinc oxide (ZnO). In the semiconductor layer 226, the LDD layer 226b is formed between the channel layer 226a and the N+ layer 226c to reduce a leakage current. The source-drain electrodes 228 each function as a source or a drain, and are configured of, for example, a single-layer film made of one of Ti, Al, Mo, W, Cr, and the like, or a laminate film made of them.

The first interlayer insulating film 231 and the second interlayer insulating film 232 each are configured of a single-layer film such as a silicon oxide film, a silicon oxynitride film, or a silicon nitride film, or a laminate film including such films. For example, the first interlayer insulating film 231 is formed through laminating a silicon oxide film 231a and a silicon nitride film 231b in order from the side closer to the substrate 110, and the second interlayer insulating film 232 is configured of a silicon oxide film.

In the embodiment, in the circuit structure of the pixel 20, one gate (for example, the first gate electrode 220A) of the transistor 22 is connected to the read control line Lread1, and the other gate (for example, the second gate electrode 220B) of the transistor 22 is connected to the read control line Lread2. A source (the source-drain electrode 228) of the transistor 22 is connected to, for example, the signal line Lsig, and a drain (the source-drain electrode 228) of the transistor 22 is connected to, for example, the cathode of the photoelectric transducer 21 through the storage node N. Moreover, in this case, an anode of the photoelectric transducer 21 is connected to a ground (is grounded).

(Row Scanning Section 13)

The row scanning section 13 includes a shift register circuit which will be described later, a predetermined logic circuit, and the like, and is a pixel drive section (a row scanning circuit) driving (line-sequentially scanning) a plurality of pixels 20 in the image pickup section 11 from one row (one horizontal line) to another. More specifically, the row scanning section 13 performs an image pickup operation including a read operation and a reset operation which will be described later by, for example, line-sequential scanning It is to be noted that the line-sequential scanning is performed through supplying the above-described row scanning signals to each pixel 20 through the read control lines Lread.

Figure 5:
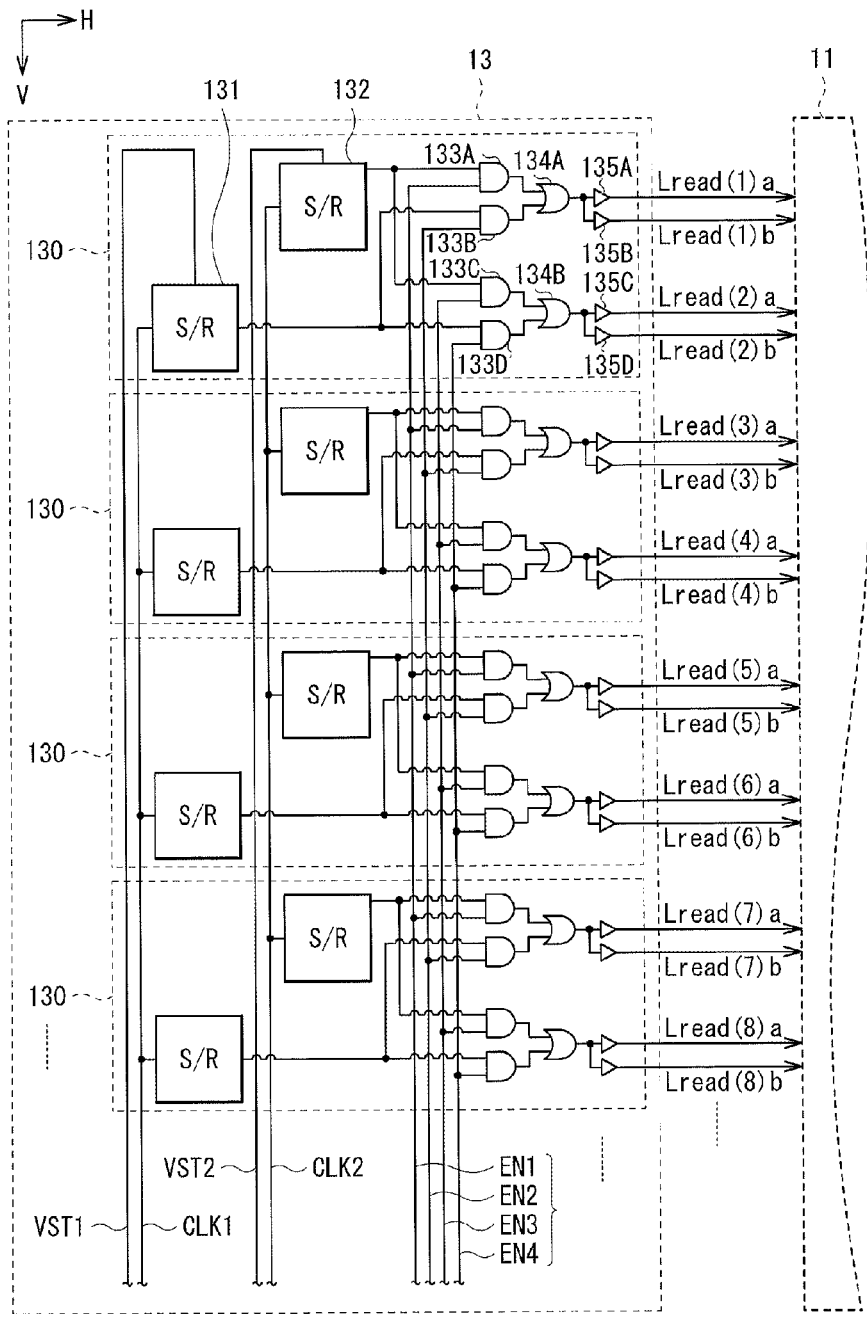
FIG. 5 is a block diagram illustrating a specific configuration example of a row scanning section illustrated in FIG. 1.

FIG. 5 is a block configuration example of the row scanning section 13. The row scanning section 13 includes a plurality of unit circuits 130 extending along the V direction. It is to be noted that eight pairs of read control lines Lread (the read control lines Lread1 and Lread2; 16 lines in total) connected to four unit circuits 130 are illustrated in this drawing. Read control lines Lread(n)a and Lread(n)b correspond to the above-described two read control lines Lread1 and Lread2, respectively, where n is any one of 1 to 8.

The unit circuits 130 each include a plurality of (two in this case) shift register circuits 131 and 132 (for the sake of convenience, abbreviated as "S/R" in blocks in FIG. 5 and following drawings), four AND circuits 133A to 133D, two OR circuits 134A and 134B, and four buffer circuits 135A to 135D.

The shift register circuits 131 are circuits being arranged in the V direction throughout the plurality of unit circuits 130 and sequentially generating a pulse signal, based on a start pulse VST1 and a clock signal CLK1 supplied from the system control section 16. Likewise, the shift register circuits 132 are circuits being arranged in the V direction throughout the plurality of unit circuits 130 and sequentially generating a pulse signal, based on a start pulse VST2 and a clock signal CLK2 supplied from the system control section 16. These shift register circuits 131 and 132 are disposed corresponding to the number (for example, two) of reset operations which will be described later (two shift register circuits 131 and 132 are disposed corresponding to the number of reset operations). In other words, for example, while the shift register circuit 131 generates a pulse signal for a first reset operation, the shift register circuit 132 generates a pulse signal for a second reset operation.

Four kinds of enable signals EN1 to EN4 for controlling (determining) a valid period of each of the pulse signals (output signals) output from the shift register circuits 131 and 132 are supplied to the AND circuits 133A to 133D, respectively. More specifically, in the AND circuit 133A, the pulse signal from the shift register circuit 132 is supplied to one input terminal, and the enable signal EN1 is supplied to the other input terminal. In the AND circuit 133B, the pulse signal from the shift register circuit 131 is supplied to one input terminal, and the enable signal EN2 is supplied to the other input terminal. In the AND circuit 133C, the pulse signal from the shift register circuit 132 is supplied to one input terminal, and the enable signal EN3 is supplied to the other input terminal. In the AND circuit 133D, the pulse signal from the shift register circuit 131 is supplied to one input terminal, and the enable signal EN4 is supplied to the other input terminal.

The OR circuit 134A is a circuit generating an OR signal between an output signal from the AND circuit 133A and an output signal from the AND circuit 133B. Likewise, the OR circuit 134B is a circuit generating an OR signal between an output signal from the AND circuit 133C and an output signal from the AND circuit 133D. Thus, an OR signal between output signals (pulse signals) from the shift register circuits 131 and 132 is generated by the above-described AND circuits 133A to 133D and the OR circuits 134A and 134B, while the valid period of each output signal is controlled. Accordingly, operation timings and the like in a plurality of reset operations which will be described later are determined.

The buffer circuits 135A and 135B are circuits functioning as buffers for an output signal (a pulse signal) from the OR circuit 134A. A pulse signal (a row scanning signal) buffered by the buffer circuits 135A and 135C is output to each pixel 20 in the image pickup section 11 through the read control line Lread(n)a. The buffer circuits 135C and 135D are circuits functioning as buffers for an output signal from the OR circuit 134B. A pulse signal (a row scanning signal) buffered by the buffer circuits 135B and 135D is output to each pixel 20 in the image pickup section 11 through the read control line Lread(n)b.

(A/D Conversion Section 14)

The A/D conversion section 14 includes a plurality of column selection sections 17 each provided for every two or more (four in this case) signal lines Lsig, and performs A/D conversion (analog-to-digital conversion), based on a signal voltage (a signal charge) received through the signal line Lsig. Thus, output data Dout (an image pickup signal) in the form of a digital signal is generated to be externally output.

Figure 6:
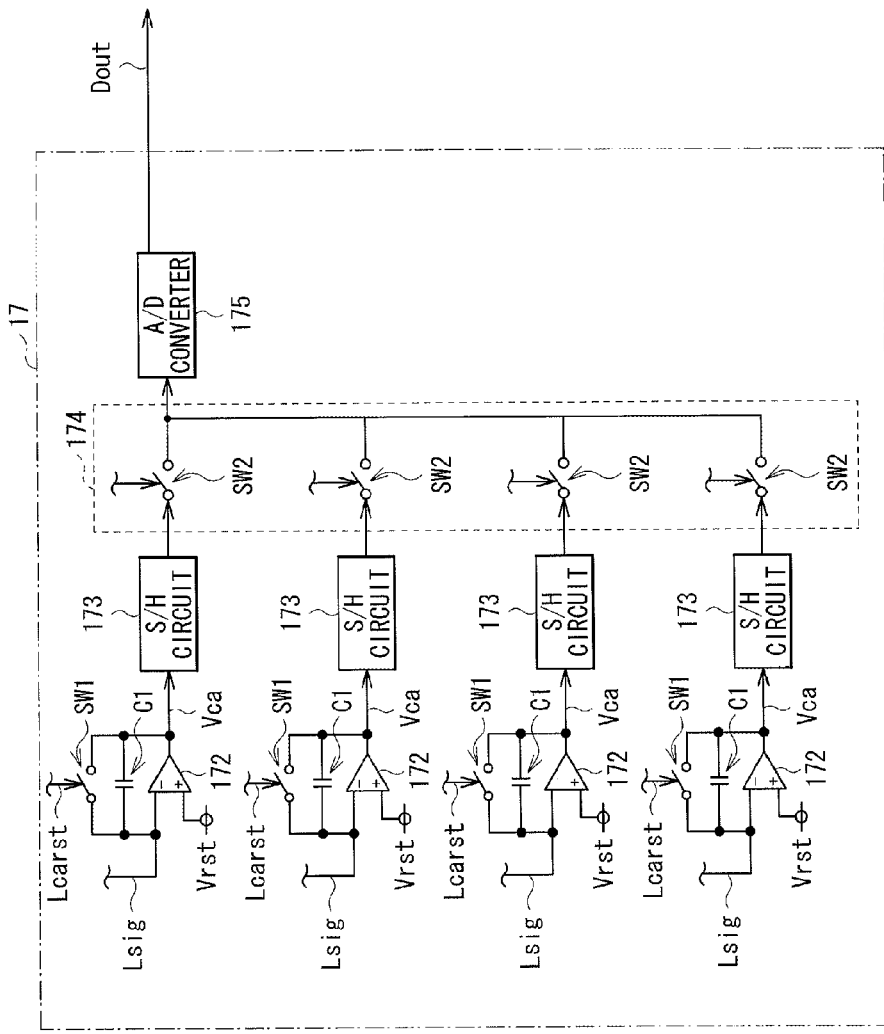
FIG. 6 is a block diagram illustrating a specific configuration example of a column selection section illustrated in FIG. 1.

For example, as illustrated in FIGS. 3 and 6, the column selection sections 17 each include a charge amplifier 172, a capacitor (a condenser, a feedback capacitor) C1, a switch SW1, a sample hold (S/H) circuit 173, a multiplexer circuit (a selection circuit) 174 including four switches SW2, and an A/D converter 175. The charge amplifier 172, the capacitor C1, the switch SW1, the S/H circuit 173, and the switches SW2 are provided for each signal line Lsig. The multiplexer circuit 174 and the A/D converter 175 are provided for each column selection section 17.

The charge amplifier 172 is an amplifier for converting a signal charge read from the signal line Lsig into a voltage (Q-V conversion). An end of the signal line Lsig is connected to a negative (−)-side input terminal of the charge amplifier 172, and a predetermined reset voltage Vrst is supplied to a positive (+)-side input terminal of the charge amplifier 172. A feedback connection is established between an output terminal and the negative-side input terminal of the charge amplifier 172 through a parallel connection circuit of the capacitor C1 and the switch SW1. In other words, one terminal of the capacitor C1 is connected to the negative-side input terminal of the charge amplifier 172, and the other terminal of the capacitor C1 is connected to the output terminal of the charge amplifier 172. Likewise, one terminal of the switch SW1 is connected to the negative-side input terminal of the charge amplifier 172, and the other terminal of the switch SW1 is connected to the output terminal of the charge amplifier 172. It is to be noted that the on-off state of the switch SW1 is controlled by a control signal (an amplifier reset control signal) supplied from the system control section 16 through the amplifier reset control line Lcarst.

The S/H circuit 173 is disposed between the charge amplifier 172 and the multiplexer circuit 174 (the switch SW2), and is a circuit temporarily holds an output voltage Vca from the charge amplifier 172.

The multiplexer circuit 174 is a circuit selectively establishing connection or disconnection between each S/H circuit 173 and the A/D converter 175 through sequentially turning on the four switches SW2 one by one according to a scanning operation by the column scanning section 15.

The A/D converter 175 is a circuit performing A/D conversion on an output voltage supplied from the S/H circuit 173 through the switch SW2 to generate and output the above-described output data Dout.

(Column Scanning Section 15)

The column scanning section 15 includes, for example, a shift register, an address decoder, and the like, and sequentially scans and drives the switches SW2 in the above-described column selection section 17. Signals (the above-described output data Dout) of respective pixels 20 read through the signal lines Lsig are sequentially and externally output by such selection scanning by the column scanning section 15.

(System Control Section 16)

The system control section 16 controls operations of the row scanning section 13, the A/D conversion section 14, and the column scanning section 15. More specifically, the system control section 16 includes a timing generator generating the above-described various timing signals (control signals), and controls actuation of the row scanning section 13, the A/D conversion section 14, and the column scanning section 15, based on the various timing signals generated in the timing generator. The row scanning section 13, the A/D conversion section 14, and the column scanning section 15 each perform an image pickup operation (a line-sequential image pickup operation) on a plurality of pixels 20 in the image pickup section 11, based on control by the system control section 16 to acquire the output data Dout from the image pickup section 11.

[Functions and Effects of Image Pickup Unit 1]

In the image pickup unit 1 according to the embodiment, when the image pickup light Lin enters the image pickup section 11, the photoelectric transducer 21 in each pixel 20 converts (photoelectrically converts) the image pickup light Lin into a signal charge. At this time, in the storage node N, a voltage variation according to node capacity is caused by accumulation of the signal charge generated by photoelectric conversion. More specifically, a voltage varies (declines in this case) by (q/Cs), where storage node capacity is Cs and the generated signal charge is q. An input voltage Vin (a voltage corresponding to the signal charge) is applied to the drain of the transistor 22 according to such a voltage variation. When the transistor 22 is switched into an on state, based on row scanning signals supplied from the read control lines Lread, the input voltage Vin supplied to the transistor 22 (the signal charge accumulated in the storage node N) is read from the pixel 20 to the signal line Lsig.

The read signal charges are supplied from every two or more (four in this case) pixel columns to the column selection section 17 in the A/D conversion section 14 through the signal lines Lsig. In the column selection section 17, first, Q-V conversion (conversion from the signal charge to a signal voltage) is performed on each of the signal charges supplied from the signal lines Lsig in a charge amplifier circuit configured of the charge amplifier 172 and the like. Next, the A/D converter 175 performs A/D conversion on each resultant signal voltage (each output voltage Vca from the charge amplifier 172) supplied through the S/H circuit 173 and the multiplexer circuit 174 to generate the output data Dout (the image pickup signal) in the form of a digital signal. Thus, the output data Dout is sequentially output from the column selection sections 17 to be externally transmitted (or to be supplied to an internal memory (not illustrated)). Such an image pickup operation will be described in detail below.

(Operation in Light Exposure Period and Read Period)

Figure 7A:
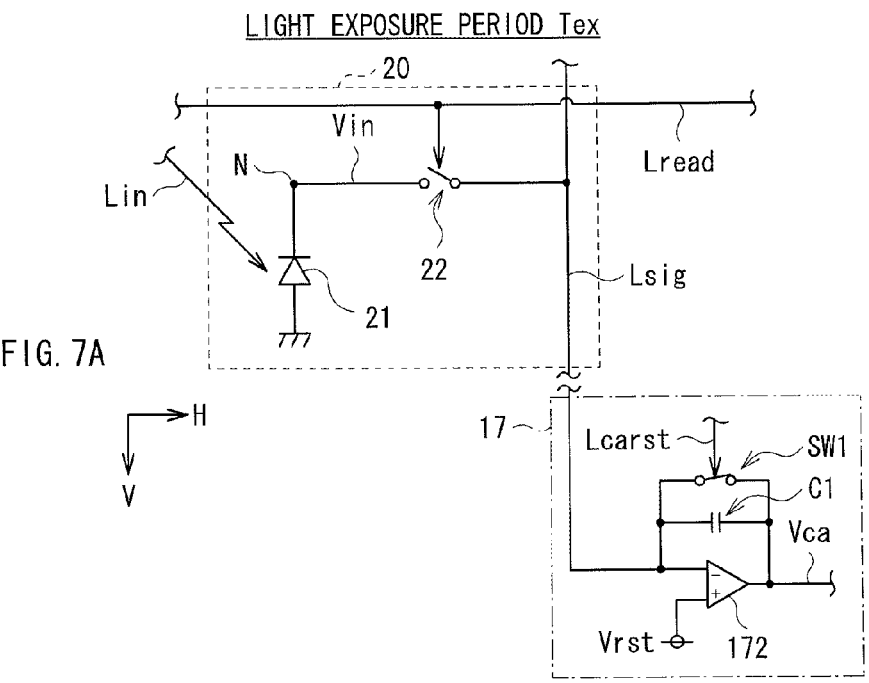
FIGS. 7A and 7B are circuit diagrams illustrating an example of an operation state in a light exposure period and an example of an operation state in a read/first reset period, respectively.
Figure 7B:
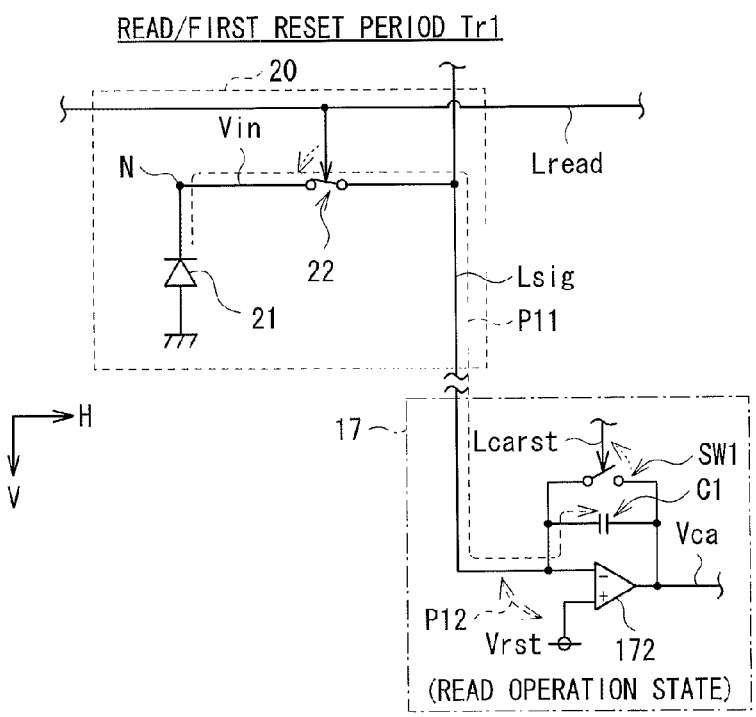

FIGS. 7A and 7B illustrate an operation example of the pixel 20 and a charge amplifier circuit in the column selection section 17 in a light exposure period and a read period, respectively. It is to be noted that, for convenience of description, the on-off state of the transistor 22 is illustrated with use of a switch.

First, as illustrated in FIG. 7A, in a light exposure period Tex, the transistor 22 is maintained in an off state. In this state, the signal charge based on the image pickup light Lin entering the photoelectric transducer 21 in the pixel 20 is accumulated in the storage node N, and is not output (read) to the signal line Lsig. On the other hand, the charge amplifier circuit is in a state after an amplifier reset operation (a reset operation of the charge amplifier circuit) which will be described later is performed; therefore, the switch SW1 is maintained in an on state, thereby forming a voltage follower circuit.

Next, after the light exposure period Tex, an operation of reading the signal charge from the pixel 20 (a read operation) and an operation of resetting (discharging) the signal charge accumulated in the pixel 20 (a reset operation, a pixel reset operation) are performed. In the embodiment, as the pixel 20 has a passive pixel circuit, the reset operation is performed along with the above-described read operation. It is to be noted that the reset operation corresponds to a first reset operation of a plurality of reset operations which will be described later. Therefore, a read period in this case is hereinafter referred to as "read/first reset period Tr1" or simply "period Tr1".

More specifically, in the read/first reset period Tr1, as illustrated in FIG. 7B, when the transistor 22 is switched into an on state, the signal charge is read from the storage node N in the pixel 20 to the signal line Lsig (refer to an arrow P11 in the drawing). The signal charge read in such a manner is supplied to the charge amplifier circuit. On the other hand, in the charge amplifier circuit, the switch SW1 is maintained in an off state (the charge amplifier circuit is maintained in a read operation state). More specifically, the switch SW1 in the charge amplifier circuit is turned into the off state immediately before the transistor 22 is switched into the on state. Therefore, the signal charge supplied to the charge amplifier circuit is accumulated in the capacitor C1, and a signal voltage (the output voltage Vca) corresponding to the accumulated charge is output from the charge amplifier 172. It is to be noted that the charge accumulated in the capacitor C1 is reset (the amplifier reset operation is performed) through turning the switch SW1 into the on state in the amplifier reset operation which will be described later.

In the read/first reset period Tr1, the following reset operation (the first reset operation) is performed along with the above-described read operation. As illustrated by an arrow P12 in the drawing, the first reset operation is performed with use of an imaginary short phenomenon in the charge amplifier circuit (the charge amplifier 172). More specifically, as a voltage on the negative-side input terminal (the signal line Lsig) in the charge amplifier 172 becomes substantially equal to a reset voltage Vrst applied to the positive-side input terminal by the imaginary short phenomenon, the storage node N also has the reset voltage Vrst. Thus, in the embodiment with use of the passive pixel circuit, in the read/first reset period Tr1, while the above-described read operation is performed, the storage node N is reset to have the predetermined reset voltage Vrst.

(Signal Charge Residue after Read/Reset)

As describe above, in the read/first reset period Tr1, the reset operation is performed along with the read operation; however, even after the period Tr1, a part of the signal charge accumulated before the period Tr1 may remain in the pixel 20. When the part of the signal charge remains in the pixel 20, an afterimage is caused by the remaining charge in the next read operation (during image pickup in the next frame period), thereby causing degradation in image quality of a picked-up image. Such a signal charge residue will be described in detail below referring to FIGS. 8 to 12.

Figure 9:
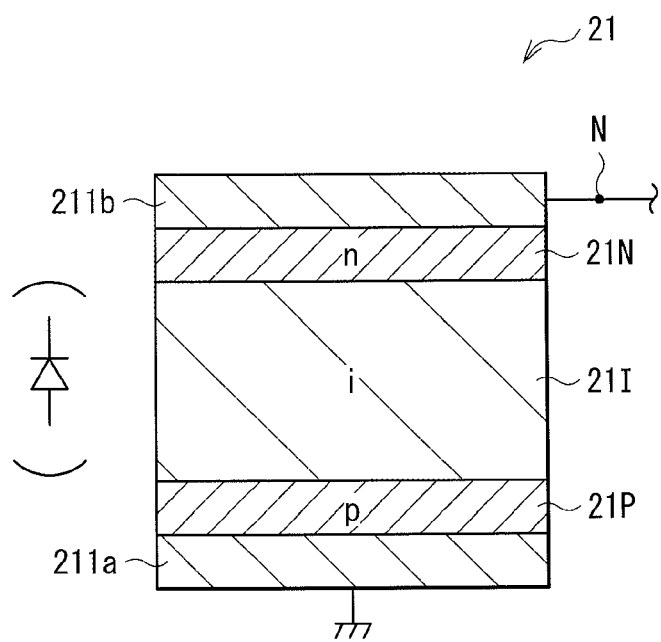
FIG. 9 is a schematic sectional view illustrating an example of a vertical PIN photodiode.

In the case where the photoelectric transducer 21 is a PIN photodiode (a thin film photodiode), the PIN photodiode is broadly classified into PIN photodiodes of the following two structures, i.e., a so-called lateral structure illustrated in parts (A) and (B) in FIG. 8 and a so-called vertical structure illustrated in FIG. 9.

In the case where the photoelectric transducer 21 is a lateral PIN photodiode, the photoelectric transducer 21 includes a p-type semiconductor layer 21P, an intrinsic semiconductor layer (an i-layer) 211, and an n-type semiconductor layer 21N in this order along a lateral direction (in an in-plane direction of a laminate plane). Moreover, the photoelectric transducer 21 includes a gate electrode 21G disposed around the intrinsic semiconductor layer 211 to face the intrinsic semiconductor layer 211 with a gate insulating film (not illustrated) in between. On the other hand, in the case where the photoelectric transducer 21 is a vertical PIN photodiode, the photoelectric transducer 21 includes, for example, a lower electrode 211a, the p-type semiconductor layer 21P, the intrinsic semiconductor layer 211, the n-type semiconductor layer 21N, and an upper electrode 211b in this order in a vertical direction (a laminating direction). It is to be noted that description will be given under the assumption that the photoelectric transducer 21 is a lateral PIN photodiode selected from the PIN photodiodes of the above-described two structures.

(Signal Charge Residue Mechanism)

As one of reasons why the signal charge remains in the above-described manner, it is considered that the charge in the pixel 20 is saturated by an influence of external light (specifically strong external light). In the photoelectric transducer 21, the intrinsic semiconductor layer 211 is switched into an accumulation mode (a saturation state), a depletion mode, or an inversion mode, based on a gate voltage applied to the gate electrode 21G. However, the order of several hundreds of us is necessary for the thin film photodiode to be switched from a state where a charge is induced in an interface closer to the gate electrode 21G in the accumulation mode or the inversion mode (refer to the part (A) in FIG. 8) to the depletion mode (refer to the part (B) in FIG. 8). In a typical PIN photodiode, light sensitivity is maximized in the depletion mode; therefore, the PIN photodiode is used in the depletion mode. However, for example, when strong external light is applied to the PIN photodiode to switch the PIN photodiode into a state where Vnp is smaller than 0 V, the PIN photodiode is switched into the accumulation mode. It is to be noted that Vnp is a potential of the n-type semiconductor layer 21N viewed from the p-type semiconductor layer 21P.

Therefore, for example, even if an environment is changed into a dark state immediately after strong external light is applied, and the reset operation (the first reset operation) is performed to allow the PIN photodiode to be switched back into the state where Vnp is larger than 0 V, the PIN photodiode is not switched from the accumulation mode to the depletion mode for several hundreds of us. It is known that capacity characteristics in the PIN photodiode vary between the depletion mode, and the accumulation mode or the inversion mode by the influence of the above-described charge induced in the interface closer to the gate electrode 21G. More specifically, as illustrated in the parts (A) and (B) in FIG. 8, a parasitic capacitance Cgp formed between the gate electrode 21G and the p-type semiconductor layer 21P is large in the accumulation mode and small in the depletion mode. Moreover, such a parasitic capacitance Cgp varies depending on a photoelectric conversion material of the photoelectric transducer 21 or a semiconductor material or the like used for the transistor 22.

In the PIN photodiode (the photoelectric transducer 21) connected to the storage node N, in the case where the parasitic capacitance Cgp varies among the depletion mode, the accumulation mode, and the inversion mode, the above-described switching from one mode to another causes a variation in an entire coupling amount (the magnitude of parasitic capacitance) in the pixel 20. Therefore, even after the read/first reset period Tr1, information (a charge) of the light entering until just before the period Tr1 remains in the storage node N. In the case where, by such a mechanism, irradiation with strong external light brings the charge in the pixel 20 into saturation, even after the read/first reset period Tr1 including the reset operation, a part of the signal charge accumulated until just before the read/first reset period Tr1 remains in the pixel 20. Such a signal charge residue caused by the strong external light is caused in a diode with a configuration in which a gate electrode is disposed below the intrinsic semiconductor layer 211 as illustrated in FIGS. 7A and 7B. However, in the case where, in either a lateral or vertical diode with a configuration not including the gate electrode, the charge reaches a point of saturation by irradiation with strong light, a signal charge residue is caused. Strictly speaking, even if the charge does not reach the point of saturation, a generated carrier is captured into a trap level by entry of strong light; therefore, it takes long to discharge the charge.

Alternatively, in addition to the above-described case (in the case where the charge is saturated by the influence of strong external light), the signal charge may remain for the following reason. A residual charge is generated through generating a decay current from the photoelectric transducer 21 (the PIN photodiode).

Figure 10:
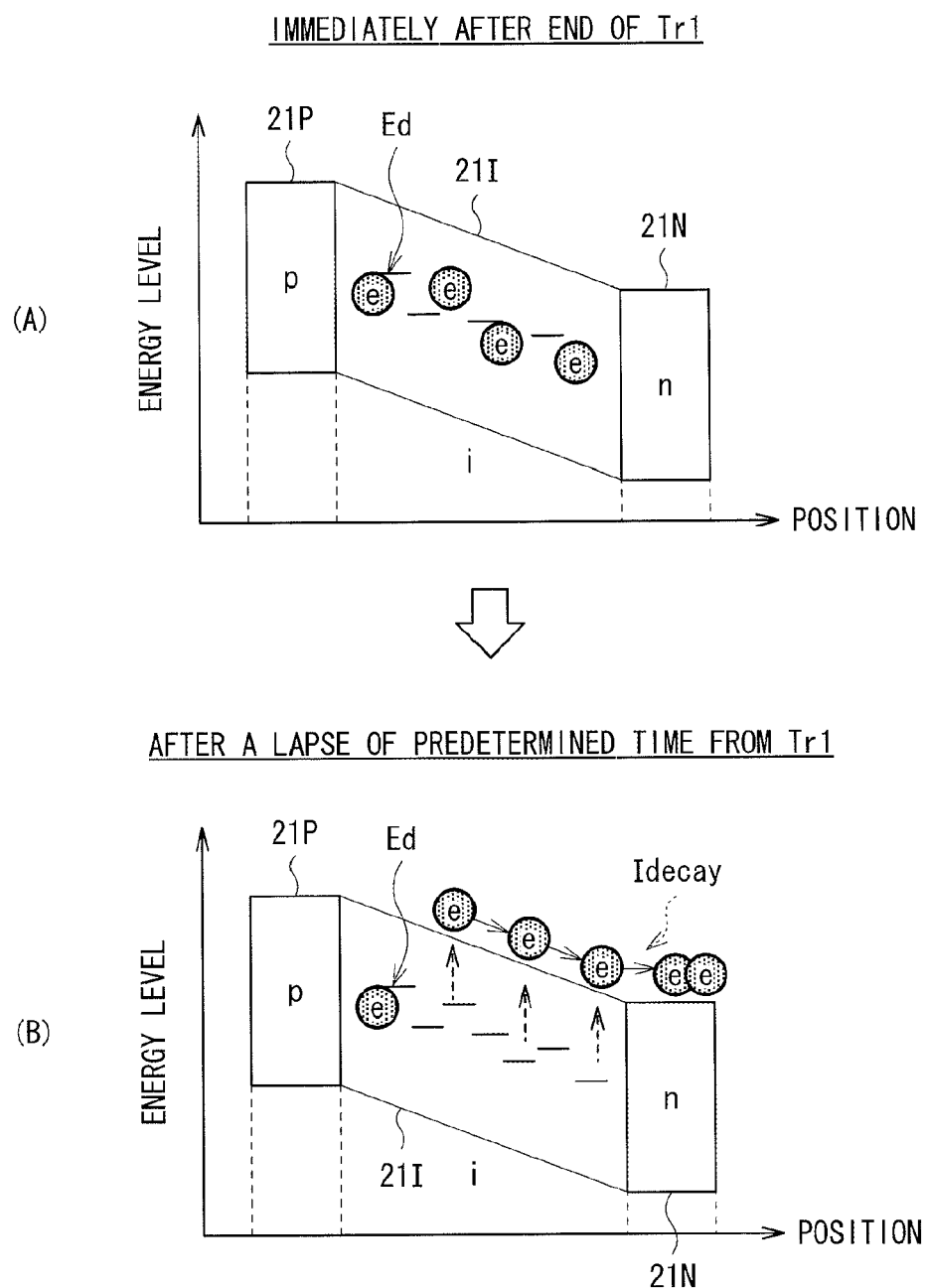
FIG. 10 is a plot for describing a mechanism of a signal charge residue.

Parts (A) and (B) in FIG. 10 illustrate an energy band structure (a relationship between the position and energy level of each layer) in the above-described PIN photodiode. It is clear from the drawings that a large number of defect levels Ed are present in the intrinsic semiconductor layer 211. As illustrated in the part (A) in FIG. 10, charges e are captured (trapped) by these defect levels Ed immediately after the read/first reset period Tr1. However, for example, as illustrated in the part (B) in FIG. 10, after a lapse of a certain time from the read/first reset period Tr1, the charges e trapped by the defect levels Ed are discharged from the intrinsic semiconductor layer 211 to outside of the photodiode (the photoelectric transducer 21) (refer to a dashed arrow in the drawing). Therefore, the above-described decay current (a current Idecay) is generated from the photoelectric transducer 21.

Figure 11A:
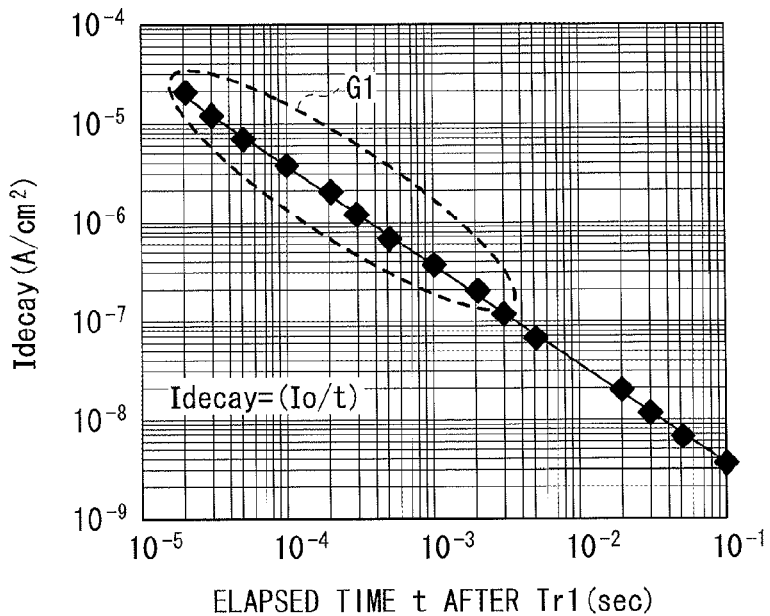
FIGS. 11A and 11B are plots illustrating an example of a relationship between an elapsed time after the read/first reset period and a decay current.
Figure 11B:
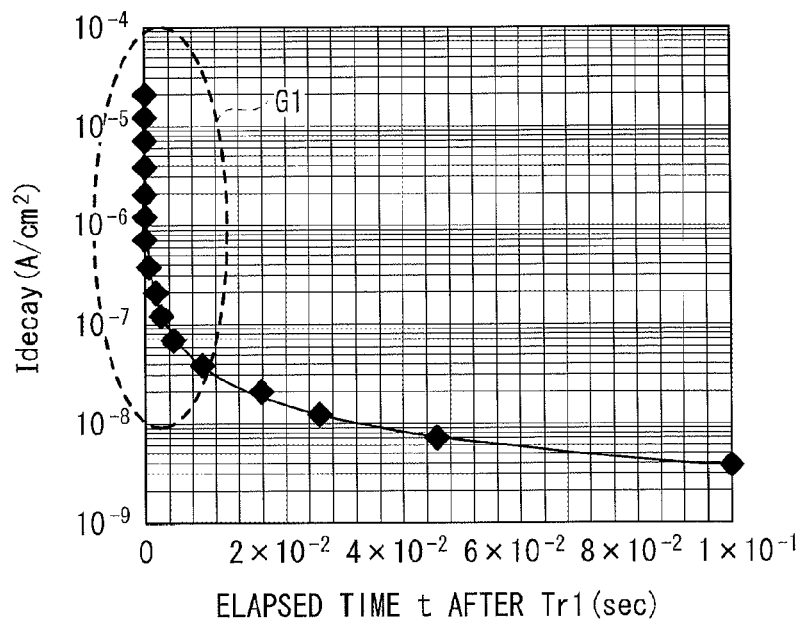

FIGS. 11A and 11B illustrate an example of a relationship between an elapsed time t after the read/first reset period Tr1 and the current Idecay. In FIG. 11A, a vertical axis and a horizontal axis both are in log scale, and in FIG. 11B, a vertical axis is in log scale, and a horizontal axis is in linear scale. Parts (G1) enclosed by a broken line in the drawings are relative to each other. It is clear from these drawings that the current Idecay tends to synergistically decrease with a lapse of time from the end (t=0) of the read/first reset period Tr1 (Idecay=($I_0$/t), where $I_0$ is a constant value). Moreover, it is clear from, for example, FIG. 12 that a residual charge (q1) generated at this time is determined through integrating the current Idecay=($I_0$/t) with respect to the elapsed time t. The residual charge is generated in the pixel 20 by such a decay current generated from the photoelectric transducer 21.

The residual charge q1 is generated in the pixel 20 even after the read/first reset period Tr1 including the reset operation due to the above-described reasons (irradiation with strong external light and generation of the decay current).
(A plurality of Reset Operations)

Therefore, in the embodiment, a plurality of reset operations (in this case, two operations in total including the reset operation in the above-described read/first reset period Tr1) are performed. Moreover, a read operation and a reset operation are line-sequentially performed, as will be described later. More specifically, a read operation and a plurality of reset operations are performed in a single line-sequential operation. Accordingly, the above-described residual charge is reduced, and an afterimage caused by the residual charge is suppressed. The plurality of reset operations will be described in detail below.

Figure 13:
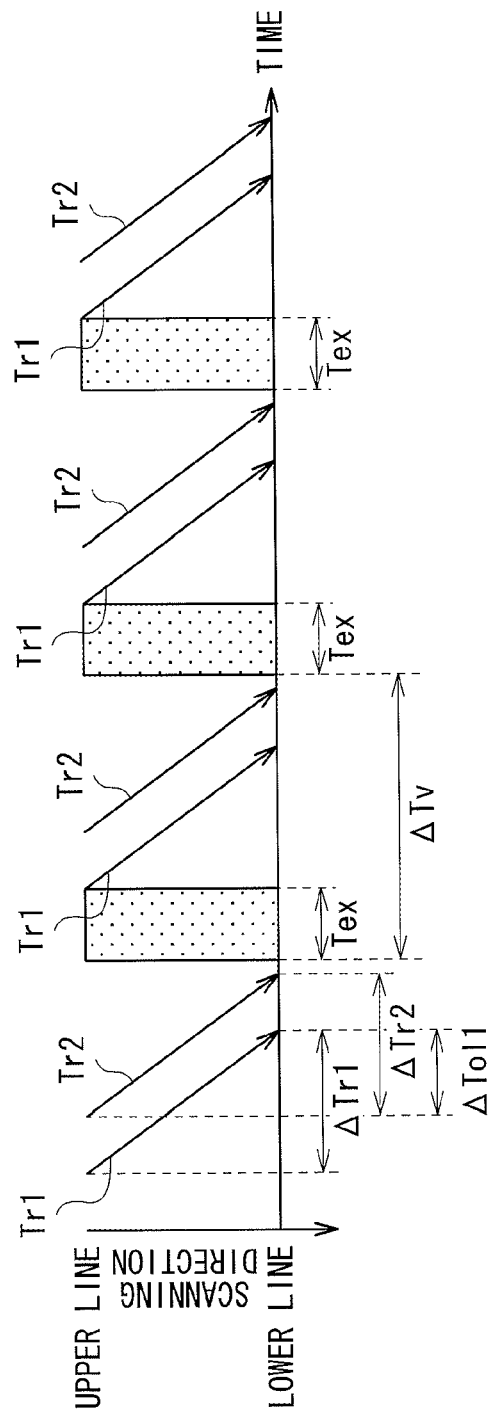
FIG. 13 is a timing chart for briefly describing a line-sequential image pickup operation according to the embodiment.

More specifically, as illustrated in FIG. 13, in one vertical period (one frame period) ΔTv, following the light exposure period Tex, a read operation and a first reset operation are performed in the read/first reset period Tr1, and then a second reset operation is performed in a second reset period Tr2 after a lapse of a predetermined time. Moreover, the read operation and the reset operations in the periods Tr1 and Tr2 are line-sequentially performed (a line-sequential read operation and line-sequential reset operations are performed on the pixels 20, based on control by the system control section 16).

Figure 14:
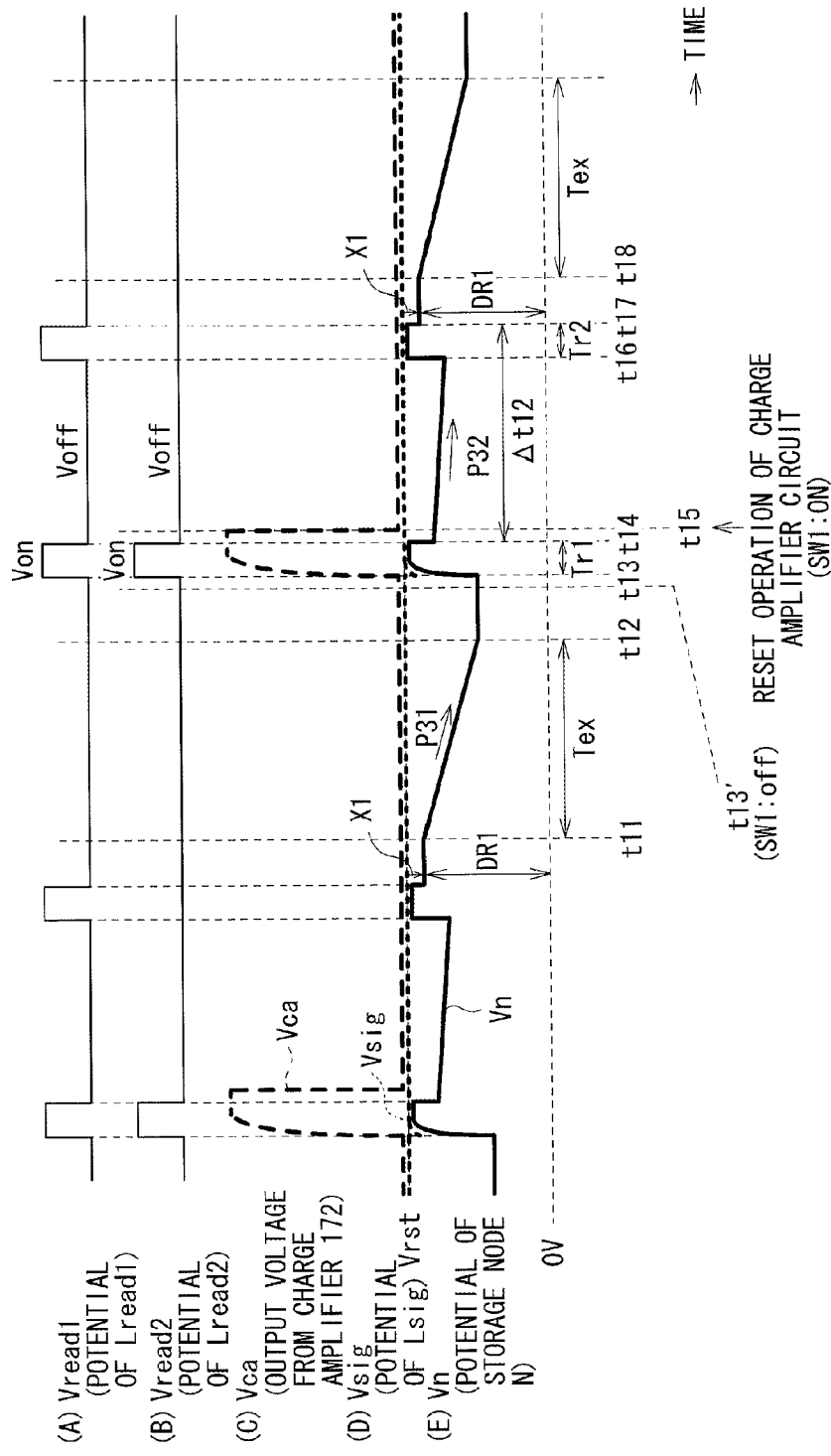
FIG. 14 is a timing waveform chart for describing an image pickup operation for one line.

In FIG. 14, parts (A), (B), (C), (D), and (E) illustrate a timing waveform of a potential Vread1 of the read control line Lread1, a timing waveform of a potential Vread2 of the read control line Lread2, a timing waveform of the output voltage Vca from the charge amplifier 172, a timing waveform of the potential Vsig of the signal line Lsig, and a timing waveform of a potential Vn of the storage node N, respectively. It is to be noted that these timing waveforms are waveforms in a period including the one frame period ΔTv and periods prior and subsequent thereto.

In the embodiment, as described above, the transistor 22 has two gates (the first gate electrode 220A and the second gate electrode 220B). When the transistor 22 is switched between an on operation and an off operation, respective voltage pulses (for example, square-wave signals) substantially in synchronization with each other are applied to the first gate electrode 220A and the second gate electrode 220B. More specifically, the potential Vread1 is applied to the first gate electrode 220A through the read control line Lread1, and the potential Vread2 is applied to the second gate electrode 220B through the read control line Lread2. It is to be noted that, in this case, it is only necessary for two common potential values (an on-potential Von and an off-potential Voff) to be applicable to the read control lines Lread1 and Lread2. An image pickup operation in which a plurality of reset operations are performed with use of the transistor 22 will be described below.

In the one frame period ΔTv, first, as described above (refer to FIG. 7A), a light exposure operation is performed in the light exposure period Tex (from a timing t11 to a timing t12), and then the photoelectric transducer 21 in each pixel 20 converts (photoelectrically converts) incident image pickup light Lin into a signal charge. Then, when the signal charge is accumulated in the storage node N in the pixel 20, the potential Vn of the storage node N gradually varies (refer to P31 in the part (E) in FIG. 14). As the cathode of the photoelectric transducer 21 is connected to the storage node N in this case, in the light exposure period Tex, the potential Vn gradually decreases toward 0 V from the reset voltage Vrst.

Next, in the read/first reset period Tr1 (from a timing t13 to a timing t14), as described above, the first reset operation is performed along with the read operation. At this time, in the embodiment, a common on-potential Von as the potentials Vread1 and Vread2 is applied to the read control lines Lread1 and Lread2. Moreover, the potentials Vread1 and Vread2 are switched from the off-potential Voff to the on-potential Von at the same timing (the timing t13), and are switched from the on-potential Von to the off-potential Voff at the same timing (the timing t14). It is to be noted that the on-potential Von is a potential allowing the transistor 22 to be switched from the off state to the on state (a high-side potential (for example, a positive potential) in a voltage pulse). The off-potential Voff is a potential allowing the transistor 22 to be switched from the on state to the off state (a low-side potential (for example, a negative potential) in the voltage pulse). It is to be noted that the switch SW1 in the charge amplifier circuit is turned into the off state at a timing t13' immediately before the timing t13 (immediately before the transistor 22 is switched into the on state). Moreover, when the switch SW1 in the charge amplifier circuit is turned into the on state at a following timing t15, a charge accumulated in the capacitor C1 in the charge amplifier is reset (an amplifier reset operation is performed).

After the read/first reset period Tr1, the residual charge q1 is generated due to the above-described reasons, thereby gradually decreasing the potential Vn of the storage node N (refer to P32 in the part (E) in FIG. 14). Therefore, in the second reset period Tr2 (from a timing t16 to a timing t17) after a lapse of a predetermined time from the read/first reset period Tr1, the second reset operation which will be described below is performed.

(Second Reset Operation)

Figure 15A:
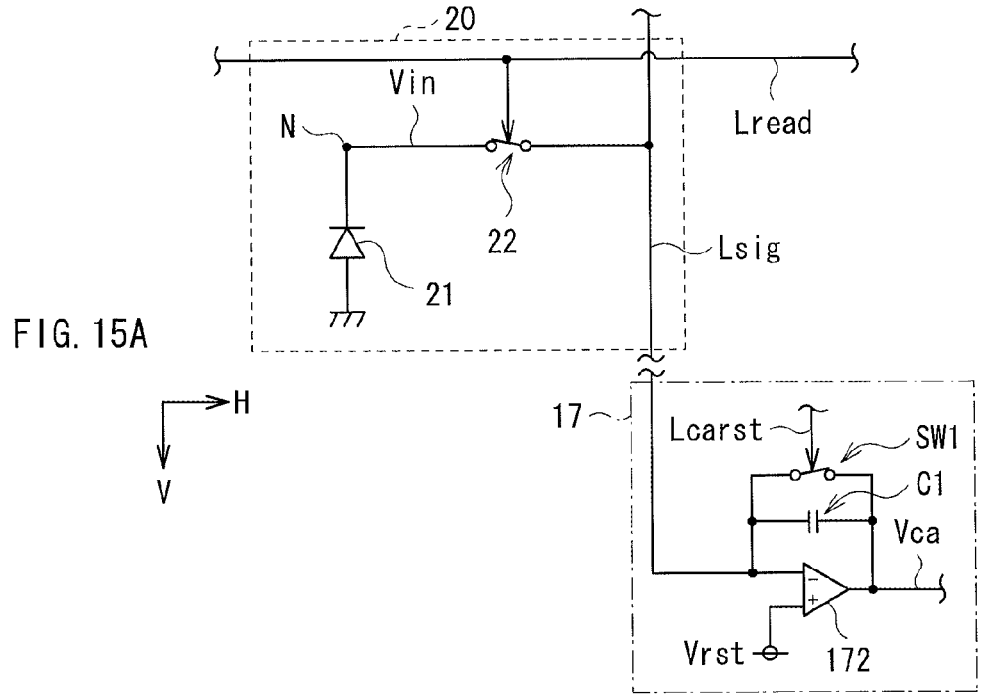
FIGS. 15A and 15B are circuit diagrams illustrating examples of an operation state in a second reset period.

In the second reset period Tr2, the second reset operation is performed as in the case of a first operation example illustrated in FIG. 15A. More specifically, the transistor 22 in the pixel 20 is maintained in the on state, and the switch SW1 in the charge amplifier circuit is also maintained in the on state. Therefore, a voltage follower circuit with use of the charge amplifier 172 is formed. Thus, in the charge amplifier 172, the feedback characteristics thereof allows a voltage on the negative-side input terminal (the signal line Lsig) to be substantially equal to the reset voltage Vrst applied to the positive-side input terminal. Accordingly, in the first operation example, the potential Vn of the storage node N in the pixel 20 is shifted to the reset voltage Vrst with use of the feedback characteristics in the charge amplifier 172 (the second reset operation is performed).

Figure 15B:
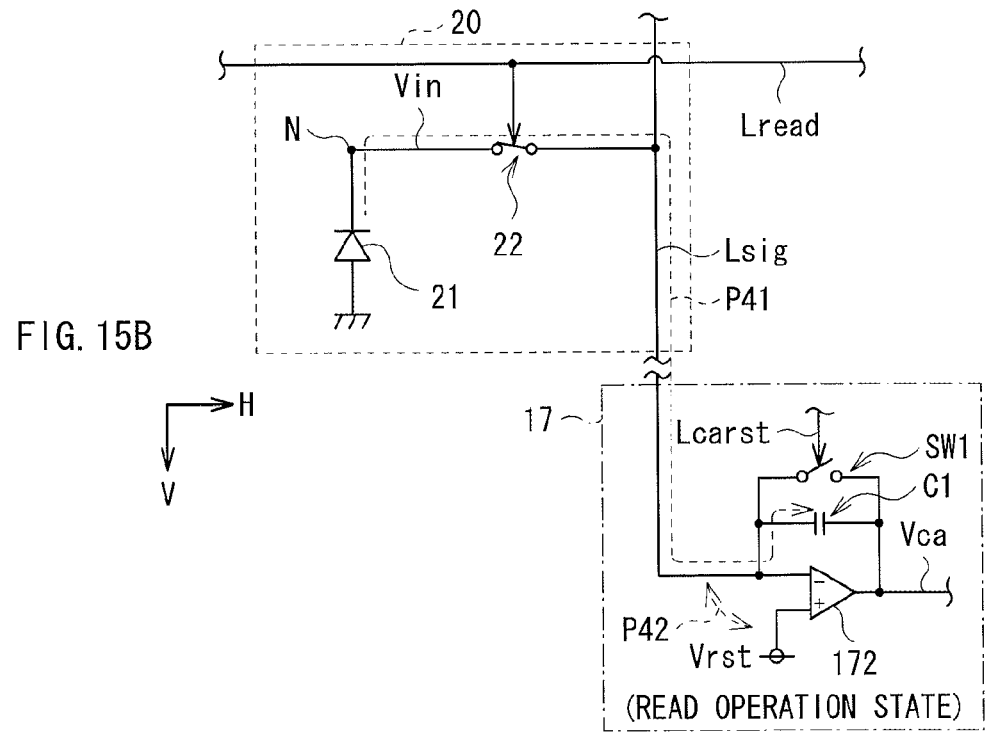

Alternatively, the second reset operation may be performed as in the case of a second operation example illustrated in FIG. 15B. As in the case of the above-described first reset operation, the second reset operation may be performed with use of the imaginary short phenomenon in the charge amplifier circuit (refer to P42 in the drawing). The potential Vn of the storage node N in the pixel 20 is shifted to the reset voltage Vrst also by the imaginary short phenomenon. However, in this example, as in the case of the read/first reset period Tr1, the transistor 22 in the pixel 20 is maintained in the on state, and the switch SW1 in the charge amplifier circuit is maintained in the off state; therefore, the charge amplifier circuit is maintained in a read operation state. In other words, as illustrated by an arrow P41 in the drawing, in the second operation example, the charge remaining in the storage node N is readable by the charge amplifier circuit.

Thus, in the embodiment, an operation of resetting the accumulated charge in the pixel 20 is intermittently and repeatedly performed in one frame period (the reset operation is performed a plurality of times). More specifically, in this case, the first reset operation (the read/first reset period Tr1) and the second reset operation (the second reset period Tr2) are performed with a predetermined time interval. Therefore, the residual charge q1 (the amount of the signal charge remaining) in the pixel 20 after the first reset operation is reduced.

Figure 12:
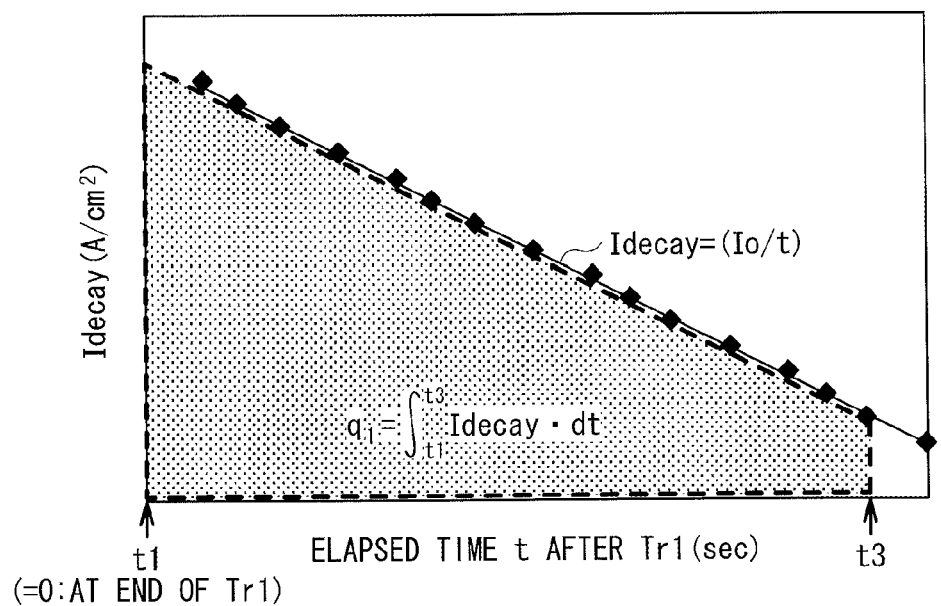
FIG. 12 is a plot for describing a relationship between a residual charge amount and the decay current.
Figure 16:
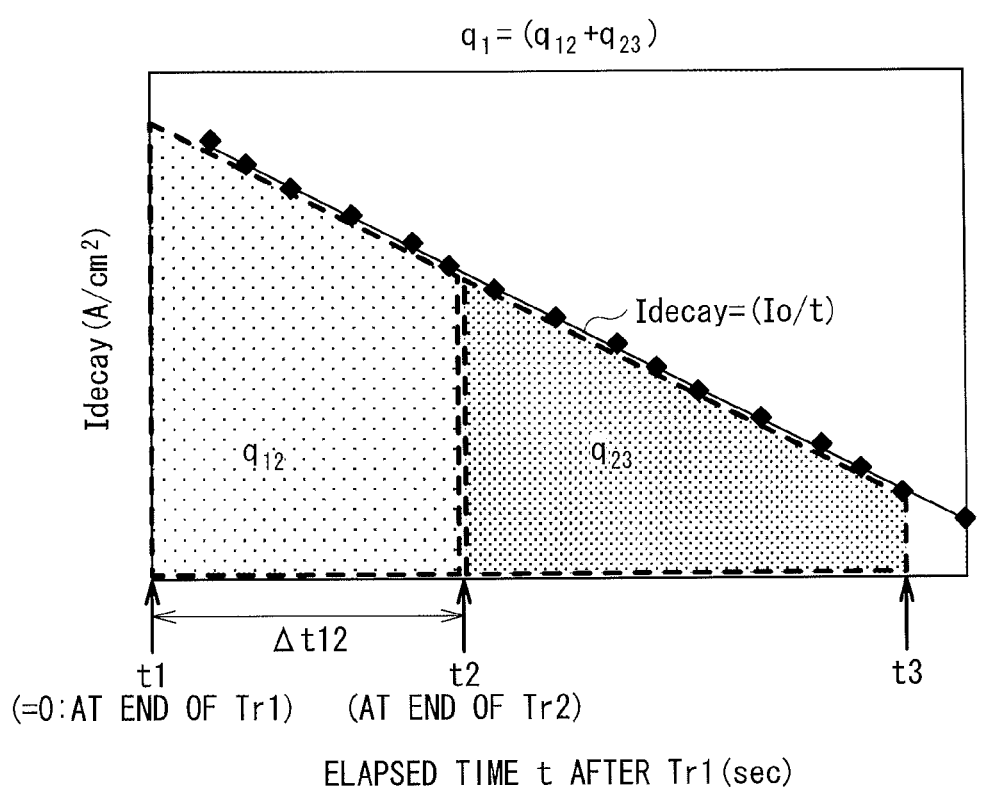
FIG. 16 is a plot for describing the residual charge amount reduced by a second reset operation.

More specifically, a charge amount reduced in the residual charge q1 is as illustrated in, for example, FIG. 16, where a time from the end of the first reset operation (the end of the period Tr1) to the end of the second reset operation (the end of the period Tr2) is Δt12. In other words, a charge q12 corresponding to a time integral value from a start time t1 (=0) of the time Δt12 to a end time t2 thereof in the residual charge q1 described in, for example, FIG. 12 is discharged (reduced) by the second reset operation. It is to be noted that a charge q23 determined by (q1−q12)=q23 corresponds to a charge amount remaining after the second reset operation; therefore, it is desirable to set the above-described time Δt12 as long as possible.

Thus, the residual charge q1 after the first reset operation is reduced by a plurality of reset operations, and an afterimage caused by the residual charge is suppressed in the next read operation (during image pickup in the next frame period).

It is to be noted that it is desirable to intermittently perform the above-described plurality of reset operations throughout, for example, a period exceeding one horizontal period (one horizontal scanning period, for example, approximately 32 μs) in a line-sequential operation for the following reason. As described above, it takes approximately several hundreds of μs to switch the PIN photodiode from one mode to another. Therefore, when the reset voltage Vrst is continuously or intermittently applied to the storage node N for, for example, approximately 100 μs, the generation of the residual charge is reduced. In actuality, it is confirmed from an experiment and the like that, when a period in which the reset voltage Vrst is applied exceeds one horizontal period (for example, approximately 32 μs), the residual charge starts to be largely reduced.

(Reduction in Charge Injection)

As described above, when a plurality of reset operations are performed, the residual charge is reduced to suppress the generation of afterimage; however, a phenomenon called charge injection occurs in the reset operation for discharging the residual charge. More specifically, as described above, the storage node N is maintained at the predetermined reset voltage Vorst after the read/first reset period Tr1, and after that, the transistor 22 is switched from the on state to the off state. At this time, the potential of the storage node N slightly varies from the reset voltage Vrst according to a potential difference (a difference between the on-potential and the off-potential).

Figure 17:
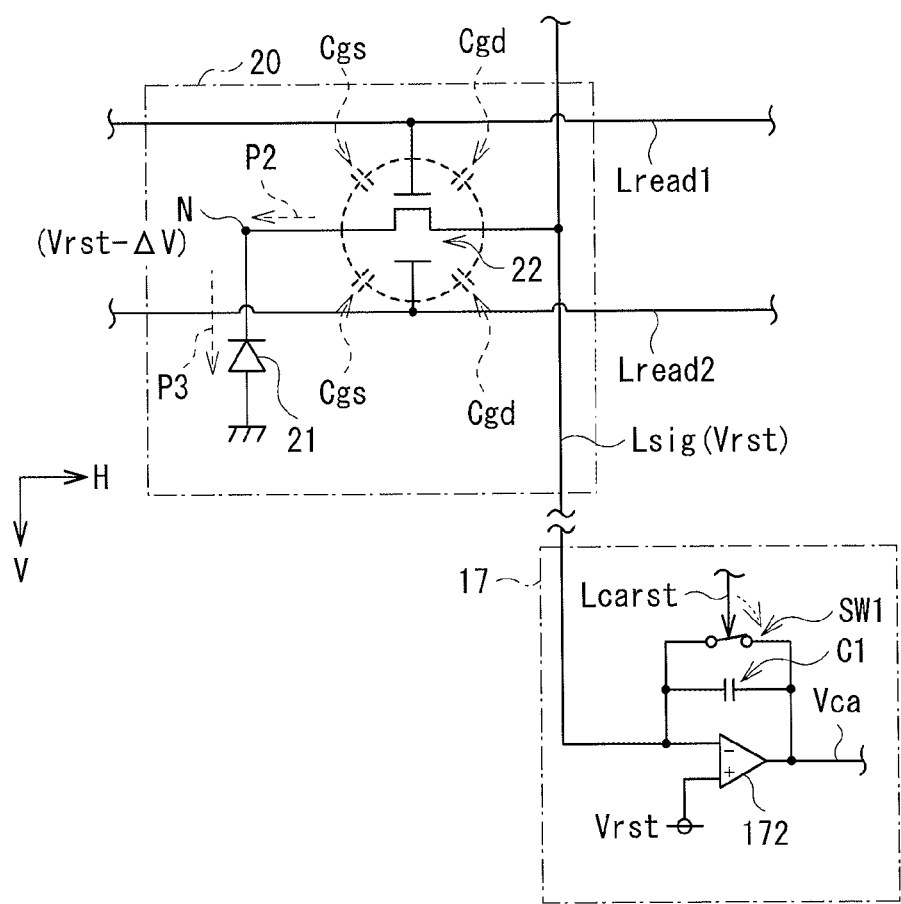
FIG. 17 is a circuit diagram for describing a charge sharing phenomenon (charge injection).

In this case, as the storage node N is connected to the cathode of the photoelectric transducer 21, as illustrated by an arrow X1 in the part (E) in FIG. 14, the potential Vn decreases from the reset voltage Vrst. The occurrence of the charge injection causes noise in the image pickup data Dout, thereby causing degradation in image quality; therefore, it is desirable to reduce the occurrence of the charge injection as much as possible. Moreover, after the off operation of the transistor 22, for example, as illustrated in FIG. 17, a charge accumulated in the parasitic capacitance (a parasitic capacitance Cgd formed between the gate and the drain of the transistor 22 and a parasitic capacitance Cgs formed between the gate and the source of the transistor 22) in the pixel 20 flows, for example, from the drain to the source by charge sharing (refer to P2 in the drawing). On the other hand, in the photoelectric transducer 21, a dark current (a leakage current; refer to P3 in the drawing) is generated. Therefore, the potential Vn after the off operation further varies according to a magnitude relationship between a charge transfer caused by the parasitic capacitances and the dark current (the potential Vn=Vrst−ΔV). For example, when an influence of the parasitic capacitance is stronger than that of the dark current, the potential Vn increases (approaches the reset potential Vrst), and when the influence of the dark current is stronger than that of the parasitic capacitance, the potential Vn decreases.

COMPARATIVE EXAMPLE

Figure 18:
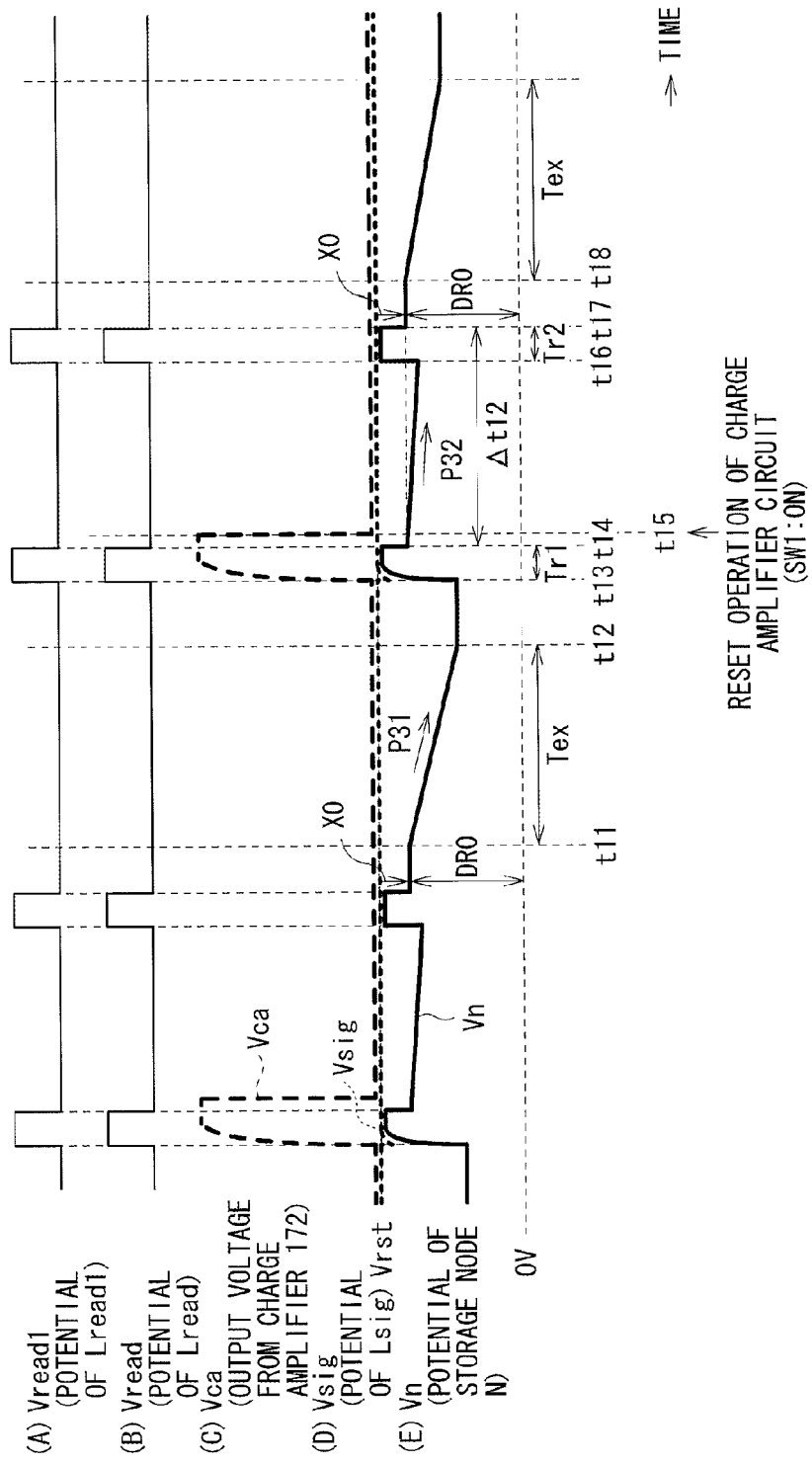
FIG. 18 is a timing waveform chart for describing an image pickup operation according to a comparative example.

Parts (A) to (E) in FIG. 18 form a timing waveform chart illustrating an image pickup operation according to a comparative example with respect to the embodiment. In the comparative example, the image pickup operation is performed with use of the same circuit structure and the same transistor as those in the embodiment. Moreover, the on-potential Von and the off-potential Voff are applied to the read control lines Lread1 and Lread2. However, in the comparative example, in the second reset operation, the potentials Vread1 and Vread2 are switched from the off-potential Voff to the on-potential Von at the same timing (t16), and are switched from the on-potential Von to the off-potential Voff at the same timing (t17).

However, in the comparative example in which the potentials Vread1 and Vread2 are switched from the on-potential Von to the off-potential Voff at the same timing and have the same amplitude, in the second reset operation, the potential Vn falls lower (refer to an arrow XO in the part (E) in FIG. 18). Moreover, in this case, as the influence of the dark current in the photoelectric transducer (PIN photodiode) becomes larger than the influence of a charge transfer caused by the parasitic capacitance after the off operation, the potential Vn further falls.

On the other hand, in the embodiment, in the second reset operation, in both of the above-described first and second operation examples, the transistor 22 is maintained in the on state, and at this time, the following operation is performed. As illustrated in the parts (A) and (B) in FIG. 14, while the on-potential Von is applied to the read control line Lread1, the off-potential Voff is applied to the read control line Lread2. More specifically, only the potential Vread1 is switched from the off-potential Voff to the on-potential Von at the timing t16, and then is switched from the on-potential Von to the off-potential Voff at the timing t17. On the other hand, the potential Vread2 is continuously maintained at the off-potential Voff in a period including the timings t16 to t17 after the read/first reset period Tr1 (after the timing t14). In other words, the potential Vread2 is not switched from the off-potential Voff to the on-potential Von (timings of switching the potential Vread2 are different from timings of switching the potential Vread1).

Figure 19:
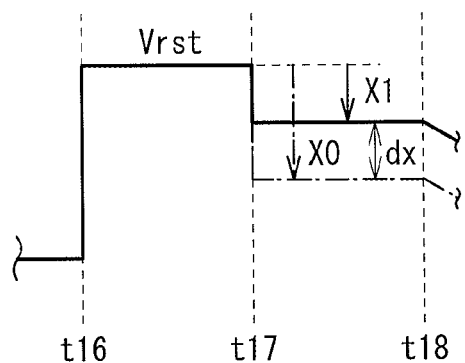
FIG. 19 is a conceptual diagram for describing an effect of reducing charge injection.

Thus, in the second reset operation, the on-potential Von is applied to the read control line Lread1, and the off-potential Voff is applied to the read control line Lread2, thereby suppressing the above-described charge injection. In other words, as illustrated by the arrow X1 in the part (E) in FIG. 14, a variation in the reset potential Vrst (a potential fall) is reduced. FIG. 19 illustrates an enlarged view of transition of the potential Vn in the above-described comparative example and the embodiment around the timings t16 to t18. A potential fall caused by the charge injection in the embodiment is smaller than that in the comparative example (the potential fall is suppressed by |X0|−|X1|=dx). In other words, the offset voltage is reduced.

Moreover, in the image pickup section 11 including a plurality of pixels 20 arranged in an array, the generation level of charge injection varies from one region to another in a plane. It is caused by the following reason. When the potential Vread is switched from the on-potential to the off-potential, in actuality, it takes a certain time to completely switch the transistor 22 from the on state to the off state. In a period in which the transistor 22 is completely switched from the on state to the off state, the transistor 22 is substantially maintained in the on state; therefore, the photoelectric transducer 21 is maintained in a chargeable state. Therefore, a charge flows to not the parasitic capacitance (Cgd) but the photoelectric transducer 21.

Thus, the more time it takes to switch the transistor 22 from the on state to the off state, the more easily the charge is applied to the photoelectric transducer 21, thereby reducing the charge injection caused by the parasitic capacitance Cgd. Switching of the transistor 22 from one state to the other tends to gradually become slower from an end of a plane of the image pickup section 11 to a center thereof; therefore, the generation level of charge injection varies from one region to another in the plane. In the embodiment, as described above, an offset component is reduced, and as a result, variations in the offset component in the plane is reduced.

When the offset component is reduced and in-plane variations in the offset component are reduced in the above-described manner, a dynamic range DR necessary for signal accumulation in each pixel 20 is reduced. In other words, the dynamic range DR is determined to have a surplus in consideration of an offset voltage and variations in the offset voltage. However, when the offset voltage and in-lane variations in the offset component are reduced, the dynamic range DR is reduced by a surplus region (an originally unnecessary region).

Thus, in the embodiment, photoelectric conversion is performed based on incident light (image pickup light Lin) in each pixel 20 of the image pickup section 11, and a signal-charge read operation and a signal-charge reset operation are performed, thereby obtaining a picked-up image based on the incident light. In the read operation and the reset operation, the potentials Vread1 and Vread2 are applied to one gate electrode (for example, the gate electrode 220A) and the other gate electrode (for example, the gate electrode 220B) of the transistor 22, respectively, substantially in synchronization with each other. However, in the reset operation, while timings of switching the potentials Vread1 and Vread2 from the on-potential Von to the off-potential Voff, the amplitudes of the potentials Vread1 and Vread2, or both thereof are adjusted to be different from each other, the transistor 22 is switched between the on operation and the off operation. More specifically, in the embodiment, in the second reset operation, while the on-potential Von is applied as the potential Vread1, the off-potential Voff is applied as the potential Vread2. Therefore, so-called charge injection caused by switching the transistor from the on operation to the off operation in the reset operation is reduced, thereby suppressing variations in a reset potential caused by the charge injection. Thus, a noise component is reduced to achieve higher image quality of a picked-up image.

It is to be noted that, in the above-described embodiment, the case where two reset operations are performed in one frame period is described; however, the embodiment is not limited thereto, and three or more reset operations may be performed in the one frame period. In this case, the above-described operation in which the potential Vread1 is switched to the on-potential Von and the potential Vread2 is switched to the off-potential Voff may be performed in one or more of the three or more reset operations. However, it is desirable to perform the above-described operation in a last reset operation in the one frame period.

Next, modifications (Modifications 1 to 11) of the above-described embodiment will be described below. It is to be noted that like components are denoted by like numerals as of the above-described embodiment, and will not be further described.

First, in the above-described embodiment, in the reset operation, the transistor 22 is switched between on and off operations while the potential Vread2 applied to the read control line Lread2 is maintained at the off-potential Voff; however, for example, as in the case of the following Modifications 1 to 4, the reset operation may be performed while the timings of switching the potentials Vread1 and Vread2, the amplitudes of the potentials Vread1 and Vread2, or both thereof are adjusted to be different from each other.

(Modification 1)

Figure 20:
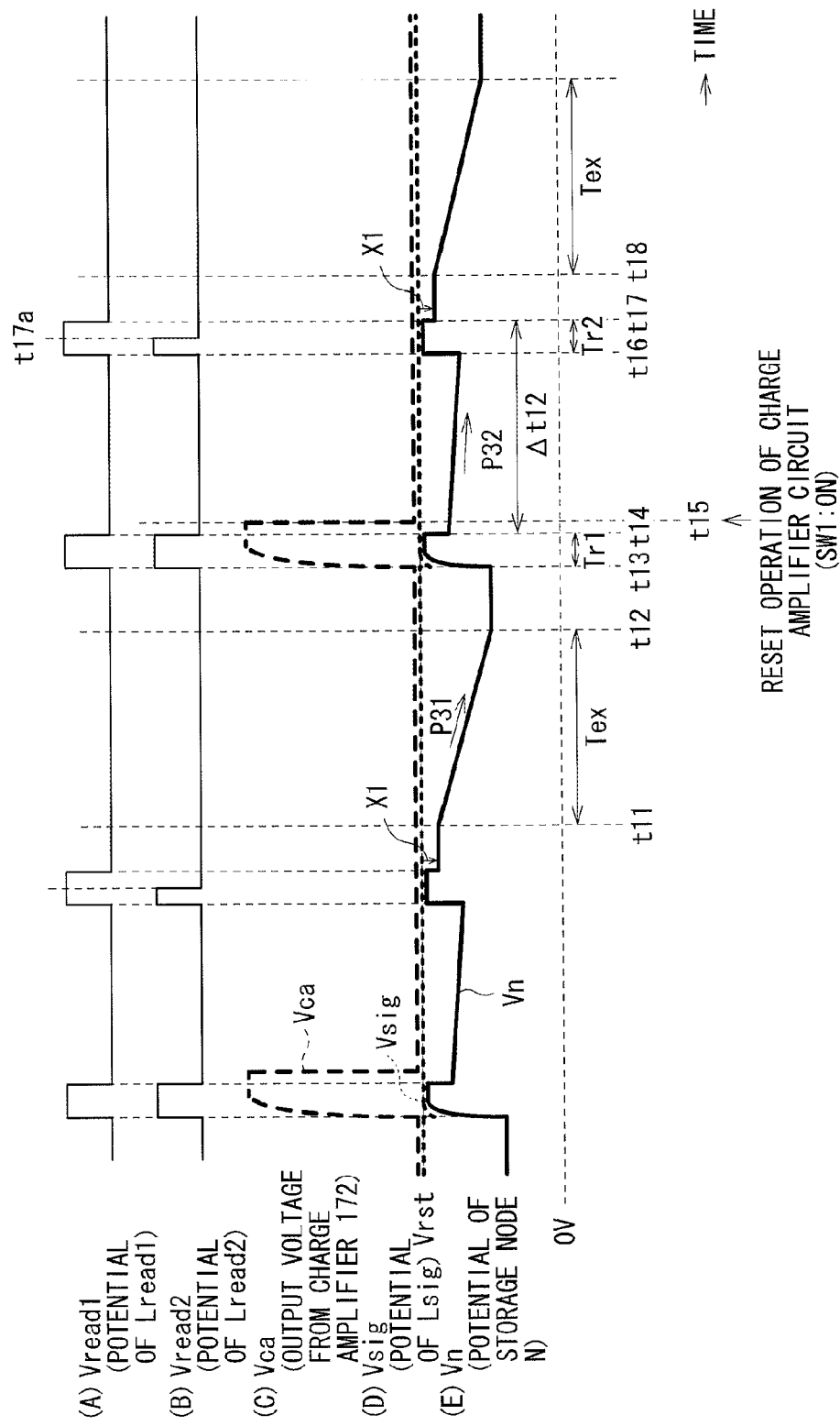
FIG. 20 is a timing waveform chart for describing an image pickup operation according to Modification 1.

Parts (A) to (E) in FIG. 20 form a timing waveform chart for describing an image pickup operation according to Modification 1. For example, in the second reset operation, the potential Vread1 and the potential Vread2 may be switched from the on-potential Von to the off-potential Voff at timings different from each other. For example, the reset operation is performed while a timing of switching the potential Vread2 from the on-potential Von to the off-potential Voff is adjusted to be earlier than a timing of switching the potential Vread1 from the on-potential Von to the off-potential Voff. More specifically, the potentials Vread1 and Vread2 both are switched from the off-potential Voff to the on-potential Von at the timing t16, and then, the potential Vread2 is switched from the on-potential Von to the off-potential Voff at a timing t17a earlier than the timing t17. After that, the potential Vread1 is switched from the on-potential Von to the off-potential Voff at the timing t17.

Figure 21:
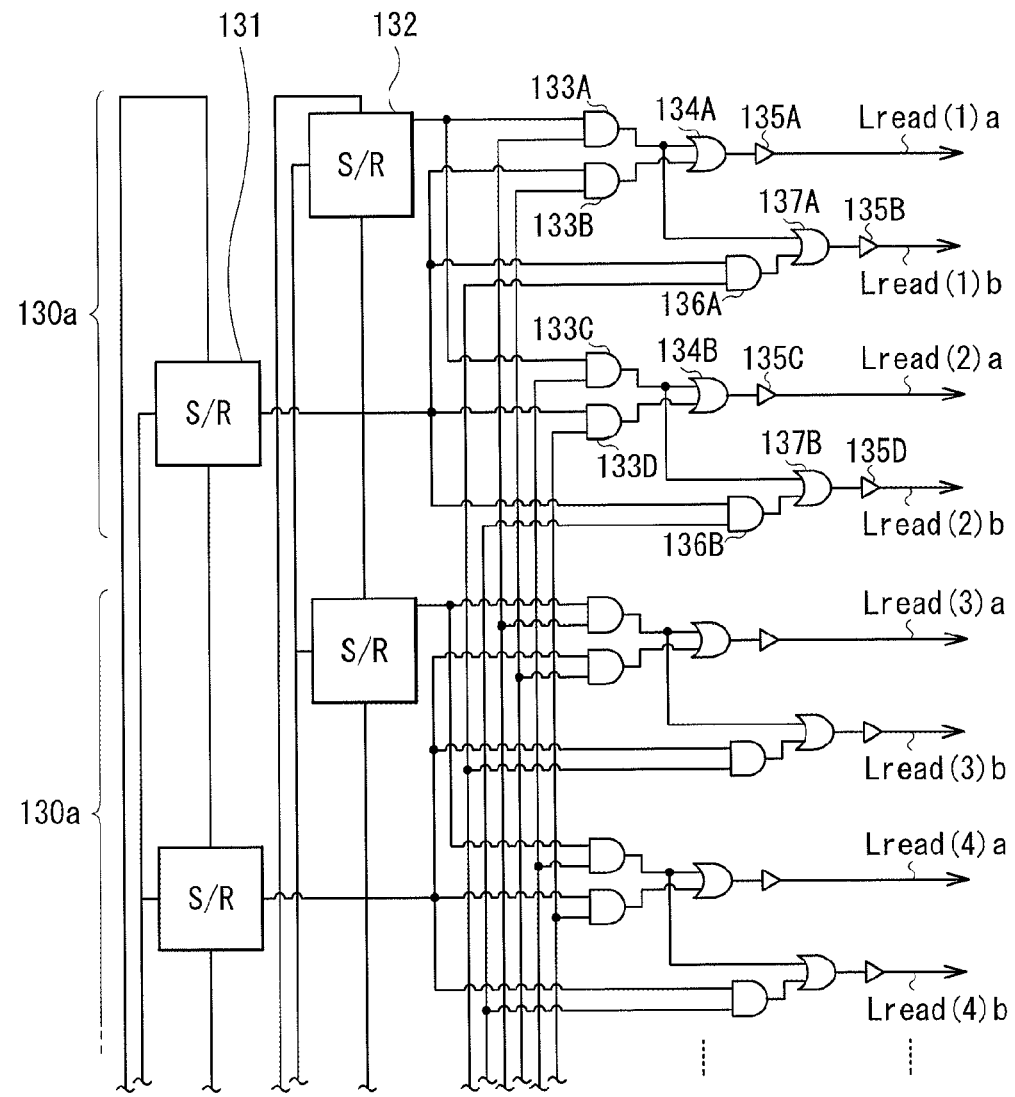
FIG. 21 is a block diagram illustrating a specific configuration of a row scanning section for performing the image pickup operation illustrated in FIG. 20.

As in the case of this modification, when, in the second reset operation, only the timings of switching the potentials Vread1 and Vread2 from the on-potential Von to the off-potential Voff are adjusted without adjusting the amplitudes of the potentials Vread1 and Vread2, for example, a unit circuit 130a illustrated in FIG. 21 may be provided in the row scanning section 13.

As illustrated in FIG. 21, the row scanning section 13 includes a plurality of unit circuits 130a extending along the V direction. In the drawing, four pairs of read control lines Lread (Lread1 and Lread2) connected to two unit circuits 130a are illustrated, and the read control lines Lread(n)a and Lread(n)b correspond to the read control lines Lread1 and Lread2, respectively, where n is any one of 1 to 4.

As in the case of the unit circuit 130 described in the above-described embodiment, the unit circuits 130a each include a plurality of (two in this case) shift register circuits 131 and 132, four AND circuits 133A to 133D, and two OR circuits 134A and 134B. Moreover, a buffer circuit 135A and a buffer circuit 135C are included as a buffer of the OR circuit 134A and a buffer of the OR circuit 134B, respectively. Output signals from the buffer circuits 135A and 135C are output to each pixel 20 in the image pickup section 11 through the read control lines Lread(n)a.

However, in this modification, the unit circuits 130a each further include two AND circuits 136A and 136B, and two OR circuits 137A and 137B. Two kinds of enable signals ENS and EN6 output from the shift register circuits 131 and 132 are supplied to the AND circuits 136A and 136B, respectively. More specifically, in the AND circuit 136A, a pulse signal from the shift register circuit 131 is supplied to one input terminal, and the enable signal ENS is supplied to the other input terminal. In the AND circuit 136B, a pulse signal from the shift register circuit 131 is supplied to one input terminal, and the enable signal EN6 is supplied to the other input terminal. Moreover, the OR circuit 137A generates an OR signal between output signals from the AND circuits 133A and 136A, and the OR circuit 137B generates an OR signal between output signals from the AND circuits 133C and 136B. A buffer circuit 135B and a buffer circuit 135D are included as a buffer of the OR circuit 137A and a buffer of the OR circuit 137B, respectively. Output signals from the buffer circuits 135B and 135D are supplied to each pixel 20 in the image pickup section 11 thorugh the read control lines Lread(n)b. It is to be noted that such unit circuits 130a adjust not only timings of switching from the on operation to the off operation in the second reset operation but also timings of switching from the off operation to the on operation to be different from each other.

In this modification, in the second reset operation, the timing of switching the potential Vread2 from the on-potential Von to the off-potential Voff may be adjusted to be earlier than the timing of switching the potential Vread1 from the on-potential Von to the off-potential Voff, and in such a operation, as in the case of the embodiment, the generation of charge injection in the reset operation is suppressed. Therefore, effects similar to those in the above-described embodiment are obtained in Modification 1.

(Modification 2)

Figure 22:
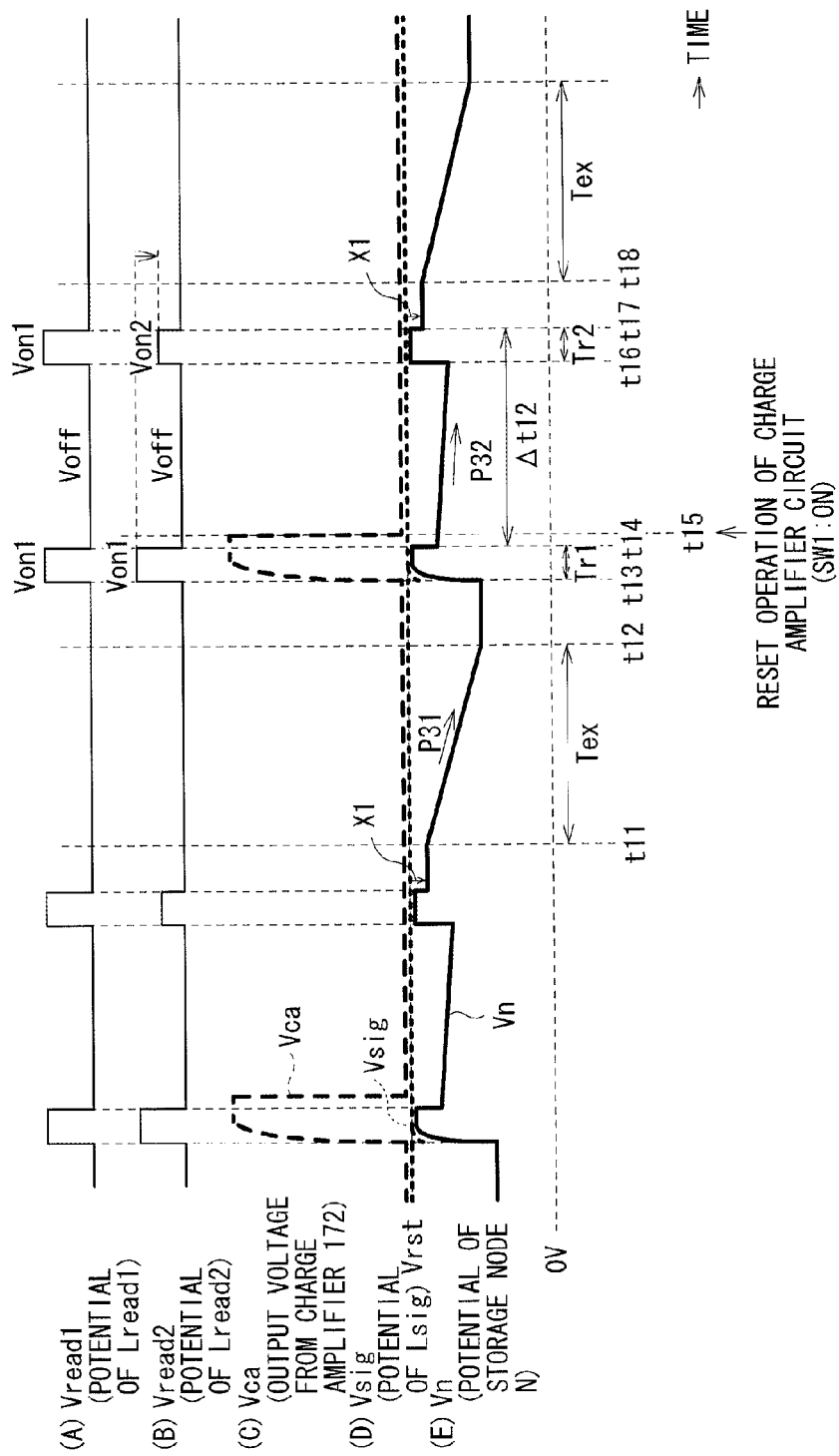
FIG. 22 is a timing waveform chart for describing an image pickup operation according to Modification 2.

Parts (A) to (E) in FIG. 22 form a timing waveform chart for describing an image pickup operation according to Modification 2. In this modification, as in the case of Modification 1, in the second reset operation, on-potentials (Von1 and Von2) are applied as the potentials Vread1 and Vread2. However, switching from the on-potential Von1 to the off-potential Voff and switching from the on-potential Von2 to the off-potential Voff are performed at the same timing. In this modification, in the second reset operation, the value of the on-potential Von1 in the potential Vread1 and the value of the on-potential Von2 in the potential Vread2 are different from each other. For example, the reset operation is performed with use of the on-potential Von1 and the on-potential Von2 which is smaller than the on-potential Vont. More specifically, the potential Vread1 is switched from the off-potential Voff to the on-potential Von1 at the timing t16, and then is switched from the on-potential Von1 to the off-potential Voff at the timing t17. On the other hand, the potential Vread2 is switched from the off-potential Voff to the on-potential Von2 at the timing t16, and then is switched from the on-potential Von2 to the off-potential Voff at the timing t17. As such an operation is performed, in this modification, three potential values (the on-potentials Von1 and Von2, and the off-potential Voff) in total are applicable to the read control lines Lread1 and Lread2.

Figure 23A:
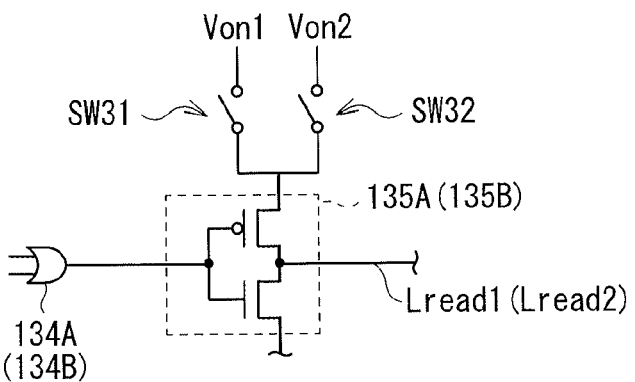
FIGS. 23A and 23B are equivalent circuit diagrams of buffer circuits for performing the image pickup operation illustrated in FIG. 22.
Figure 23B:
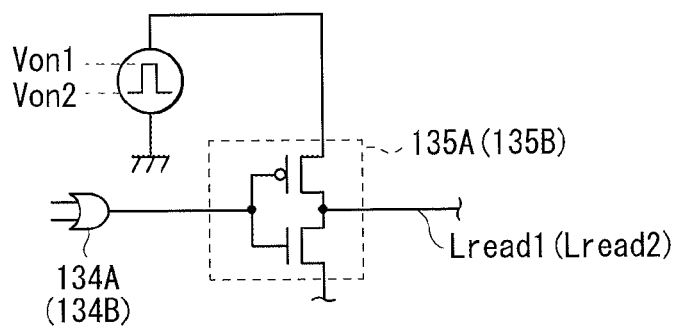

When three potential values are applied to the read control lines Lread1 and Lread2 to perform the reset operation as in the case of this modification, for example, buffer circuits illustrated in FIGS. 23A and 23B may be used as the buffer circuits 135A to 135D of the unit circuit 130 described in the above-described embodiment. For example, as illustrated in FIG. 23A, switches SW31 and SW32 are provided on a high side of the buffer circuit 135A (or any one of the buffer circuits 135B to 135D), and the switch SW31 is maintained in the on state, and the switch SW32 is maintained in the off state, thereby switching the high side of the buffer circuit 135A to the on-potential Von1. On the other hand, when the switch SW31 is maintained in the off state and the switch SW32 is maintained in the on state, the high side of the buffer circuit 135A is switched to the on-potential Von2. Alternatively, as illustrated in FIG. 23B, a voltage pulse with two values (Von1 and Von2) may be formed in an external device of the image pickup unit 1 to be used as a high-side voltage. It is to be noted that it is only necessary to perform switching between three values only in the read control line Lread2 of the read control lines Lread1 and Lread2; therefore, it is only necessary for the buffer circuit 135A (or 135C) or the buffer circuit 135B (or 135D) of the buffer circuits 135A to 135D to have the above-described circuit structure.

Thus, in the second reset operation, the on-potential Von2 in the potential Vread2 may be smaller than the on-potential Von1 in the potential Vread1, and even in such an operation, as in the case of the above-described embodiment, the generation of charge injection in the reset operation is suppressed. Therefore, effects similar to those in the above-described embodiment are obtained in Modification 2.

(Modification 3)

Figure 24:
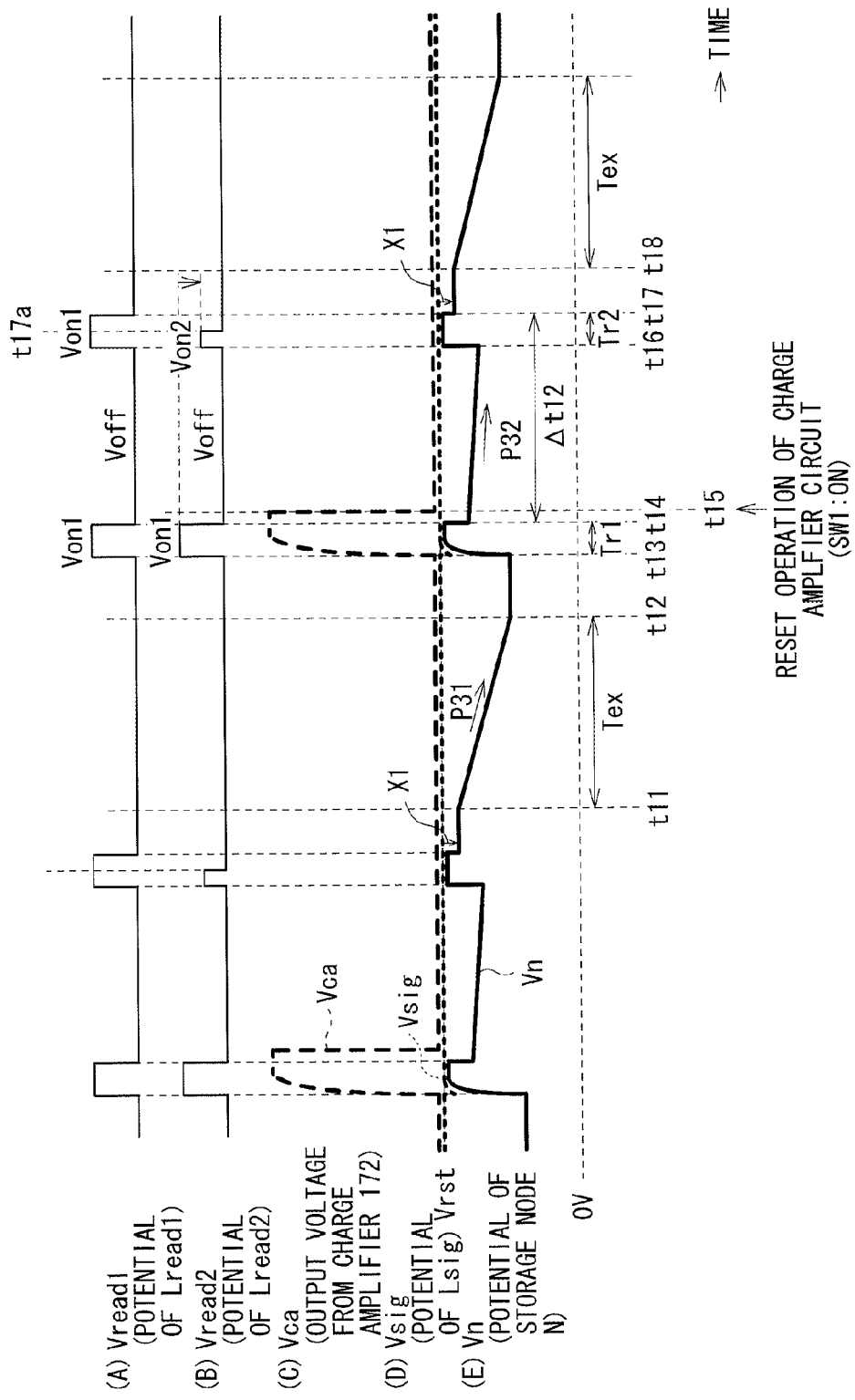
FIG. 24 is a timing waveform chart for describing an image pickup operation according to Modification 3.

Parts (A) to (E) in FIG. 24 form a timing waveform chart for describing an image pickup operation according to Modification 3. In this modification, in the second reset operation, as in the case of Modification 1, the timing of switching the potential Vread2 from the on-potential Von2 to the off-potential Voff is adjusted to be earlier than the timing of switching the potential Vread1 from the on-potential Von1 to the off-potential Voff, and as in the case of Modification 2, the reset operation is performed with use of the on-potential Von2 smaller than the on-potential Von1.

As in the case of this modification, in the case where, in the second reset operation, timings of switching the potentials Vread1 and Vread2 and the values of the on-potentials in the potentials Vread1 and Vread2 both are different from each other, the unit circuits 130a in Modification 1 may be used, and buffer circuits switchable between three values described in Modification 2 may be used as the buffer circuits 135A to 135D (more specifically, buffer circuits 135A and 135C or the buffer circuits 135B and 135D).

Thus, in the second reset operation, the timing of switching the potential Vread2 from the on-potential Von2 to the off-potential Voff may be adjusted to be earlier than the timing of switching the potential Vread1 from the on-potential Von1 to the off-potential Voff, and the on-potential Von2 may be adjusted to be smaller than the on-potential Von1. Even in such an operation, as in the case of the above-described embodiment, the generation of charge injection in the reset operation is suppressed. Therefore, effects similar to the above-described embodiment are obtained in Modification 3.

(Modification 4)

Figure 25:
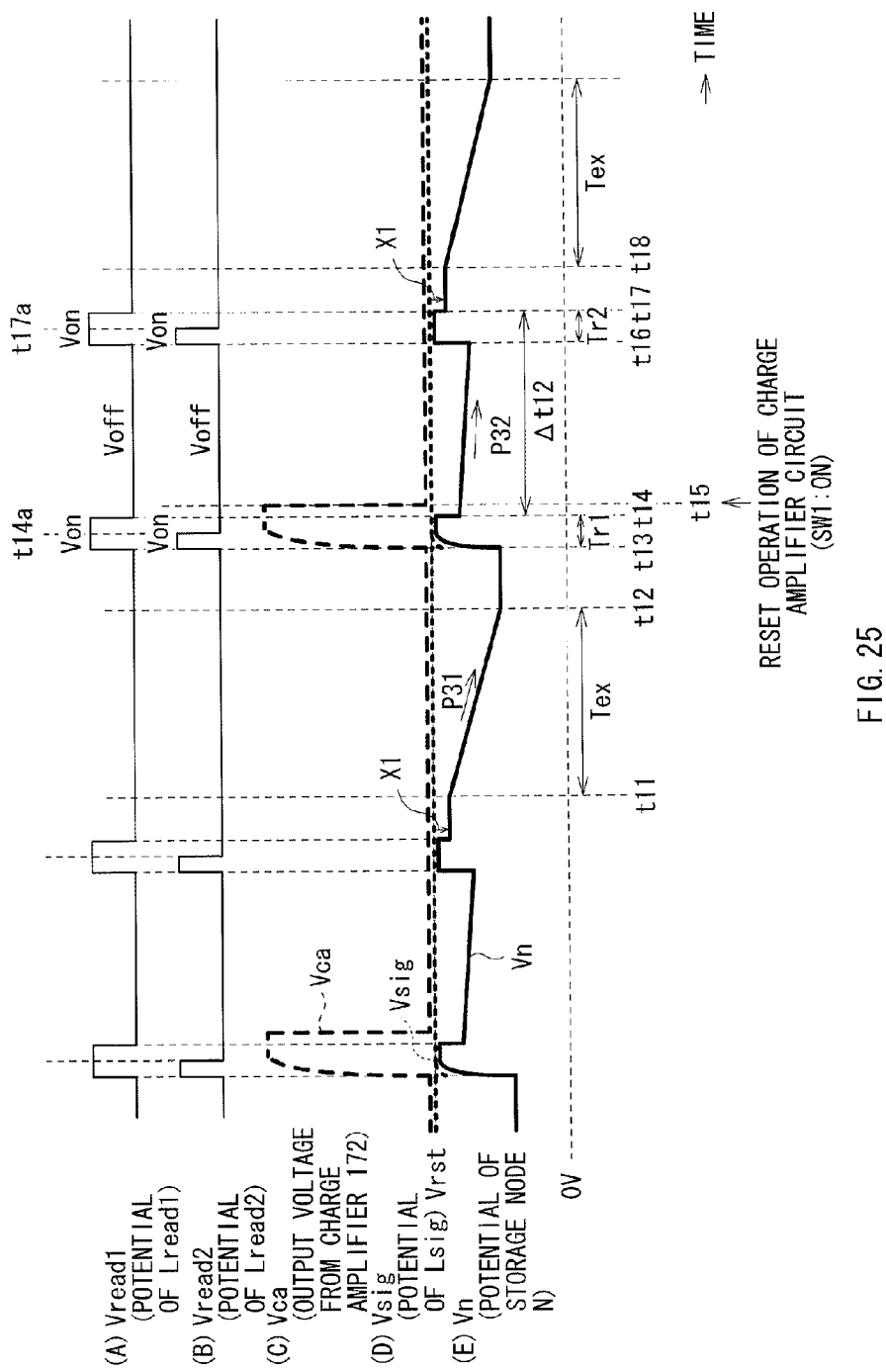
FIG. 25 is a timing waveform chart for describing an image pickup operation according to Modification 4.

Parts (A) to (E) in FIG. 25 form a timing waveform chart for describing an image pickup operation according to Modification 4. In the above-described embodiments and the like, the case where, the second reset operation is performed, while the timings of switching the potentials Vread1 and Vread2 from the on-potential Von to the off-potential Voff, the values of the on-potentials Von in the potentials Vread1 and Vread2, or both thereof are different from each other is described; however, such an operation may be performed in the first reset operation. For example, in the first reset operation, the timings of switching the potentials Vread1 and Vread2 from the on-potential Von to the off-potential Voff may be different from each other (the timing of switching potential Vread2 from the on-potential Von to the off-potential Voff may be adjusted to be earlier than the timing of switching the potential Vread1 from the on-potential Von to the off-potential Voff). More specifically, the potentials Vread1 and Vread2 both are switched from the off-potential Voff to the on-potential Von at the timing t13, and then the potential Vread2 is switched from the on-potential Von to the off-potential Voff at a timing t14a which is earlier than the timing t14. After that, the potential Vread1 is switched from the on-potential Von to the off-potential Voff at the timing t14.

Figure 26:
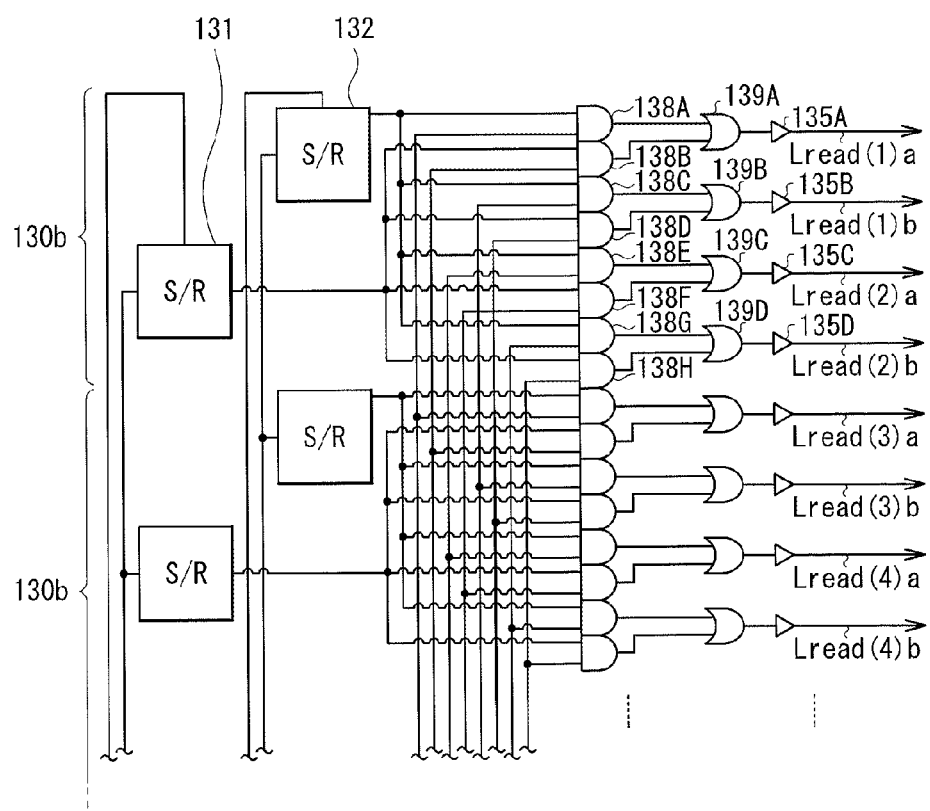
FIG. 26 is a block diagram illustrating a specific configuration of a row scanning section for performing the image pickup operation illustrated in FIG. 25.

As in the case of this modification, when the timings of switching the potentials Vread1 and Vread2 may be different from each other in both of the first reset operation (the read operation) and the second reset operation, for example, a unit circuit 130b illustrated in FIG. 26 may be included in the row scanning section 13.

As illustrated in FIG. 26, a plurality of unit circuits 130b extending along the V direction are included in the row scanning section 13. In the drawing, four pairs of read control lines Lread (Lread1 and Lread2) connected to two unit circuits 130b are illustrated, and read control lines Lread(n)a and Lread(n)b correspond to the above-described read control lines Lread1 and Lread2, respectively, where n is any one of 1 to 4.

As in the case of the unit circuit 130 described in the above-described embodiment, the unit circuits 130b each include a plurality of (two in this case) shift register circuits 131 and 132, a plurality of AND circuits, a plurality of OR circuits, and buffer circuits 135A to 135D. However, in this modification, eight kinds of enable signals EN1 to EN8 output from the shift register circuits 131 and 132 are used, that is, eight AND circuits 138A to 138H are included. Moreover, four OR circuits 139A to 139D generating OR signals between output signals of the AND circuits 138A to 138H are included.

More specifically, in the AND circuit 138A, a pulse signal from the shift register circuit 132 is supplied to one input terminal, and the enable signal EN1 is supplied to the other input terminal. In the AND circuit 138B, a pulse signal from the shift register circuit 131 is supplied to one input terminal, and the enable signal EN2 is input into the other input terminal. In the AND circuits 138C to 138H, a pulse signal from one of the shift register circuits 131 and 132 is supplied to one input terminal, and one of the enable signals EN3 to EN8 is supplied to the other input terminal in a similar manner. The OR circuit 139A generates an OR signal between output signals from the AND circuits 138A and 138B, and the OR circuit 139B generates an OR signal between output signals from the AND circuits 138C and 138D. Likewise, the OR circuit 139C generates an OR signal between output signals from the AND circuits 138E and 138F, and the OR circuit 139D generates an OR signal between output signal from the AND circuits 138G and 138H. Buffer circuits 135A to 135D are provided as buffers of the OR circuits 139A to 139D. Output signals from the buffer circuits 135A and 135C are supplied to the image pickup section 11 through the read control lines Lread(n)a, and output signals from the buffer circuits 135B and 135D are supplied to the image pickup section 11 through the read control lines Lread(n)b.

Thus, in the first reset operation, the timing of switching the potential Vread2 from the on-potential Von2 to the off-potential Voff may be adjusted to be earlier than the timing of switching the potential Vread1 from the on-potential Von to the off-potential Voff. Even in such an operation, as in the case of the above-described embodiment, the generation of charge injection in the reset operation is suppressed. Therefore, effects similar to those in the above-described embodiment are obtained in Modification 4. It is to be noted that, in the first reset operation, any one of the operations described in Modifications 2 to 4 may be performed, or a combination of these operations may be performed in the first and second reset operations.

(Modification 5)

Figure 27:
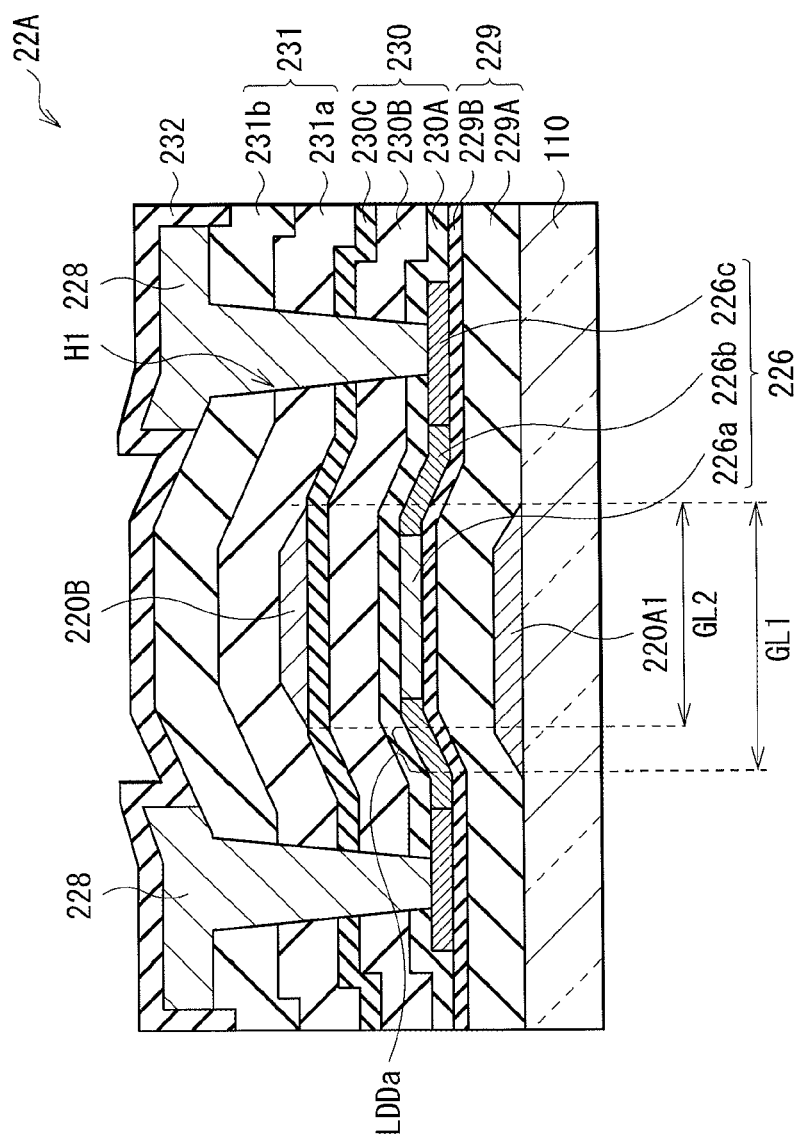
FIG. 27 is a sectional view illustrating a specific configuration of a transistor according to Modification 5.

FIG. 27 is a sectional view illustrating a schematic configuration of a transistor (a transistor 22A) according to Modification 5. In the above-described embodiment, the case where the above-described read operation and the above-described reset operation are performed with use of the transistor (the transistor 22 illustrated in FIG. 4) including two gate electrodes is described. However, one of the two gate electrodes may overlap the LDD layer. More specifically, as in the case of the transistor 22 in the above-described embodiment, the transistor 22A includes a first gate electrode 220A1, the first gate insulating film 229, and the semiconductor layer 226 (including the channel layer 226a, the LDD layer 226b, and the N+ layer 226c) on the substrate 110. Moreover, the second gate insulating film 230, the second gate electrode 220B, and the first interlayer insulating film 231 are laminated on the semiconductor layer 226. The source-drain electrodes 228 are formed on the first interlayer insulating film 231 to fill in the contact holes H1, and the second interlayer insulating film 232 is disposed on the source-drain electrode 228.

However, in this modification, one gate electrode, for example, the gate electrode 220A1 is formed to overlap the LDD layer 226b, thereby having a so-called GOLD (Gate Overlapped LDD) structure. In other words, the gate lengths of the gate electrodes 220A1 and 220B are different from each other, and in this case, a gate length GL1 of the gate electrode 220A1 is longer than a gate length GL2 of the gate electrode 220B.

The above-described read operation and the above-described reset operation may be performed with use of such a transistor 22A including the gate electrodes 220A1 and 220B. The above-described read control line Lread2 is connected to the gate electrode 220A1 having the GOLD structure, and the read control line Lread1 is connected to the gate electrode 220B, and as in the case of Modification 1 (refer to the parts (A) and (B) in FIG. 20), the reset operation is performed while the potential Vread2 applied to the gate electrode 220A1 is switched from the on-potential Von to the off-potential Voff at an earlier timing. Therefore, at the timing t17a at which the potential Vread2 is switched from the on-potential Von to the off-potential Voff, a part (LDDa) overlapping the gate electrode 220A1 of the LDD layer 226b is depleted. Accordingly, when the potential Vread1 is switched from the on-potential Von to the off-potential Voff at the timing t17, electrons of the channel layer 226a are escaped to the depleted part LDDa, thereby decreasing a leakage current. In other words, a period in which the photoelectric transducer 21 is discharged is provided, and as a result, charge injection is reduced.

As in the case of this modification, the above-described image pickup operation may be performed with use of the transistor 22A including two gate electrodes with gate lengths different from each other (with the GOLD structure). In this case, effects similar to those in the above-described embodiment are obtained, and an effect of reducing charge injection by depleting the LDD layer 226b is added, thereby more effectively suppressing a reduction in the potential Vn in the storage node N.

It is to be noted that, in this modification, a lower gate electrode (the gate electrode 220A1) of the two gate electrodes overlaps the LDD layer 226b; however, an upper gate electrode (the gate electrode 220B) may overlap the LDD layer 226b. Moreover, the two gate electrodes may overlap the LDD layer 226b. In the case where the upper gate electrode overlaps the LDD layer 226b, the gate length of the upper gate electrode is longer than that of the lower gate electrode (GL2>GL1).

(Modification 6)

Figure 28:
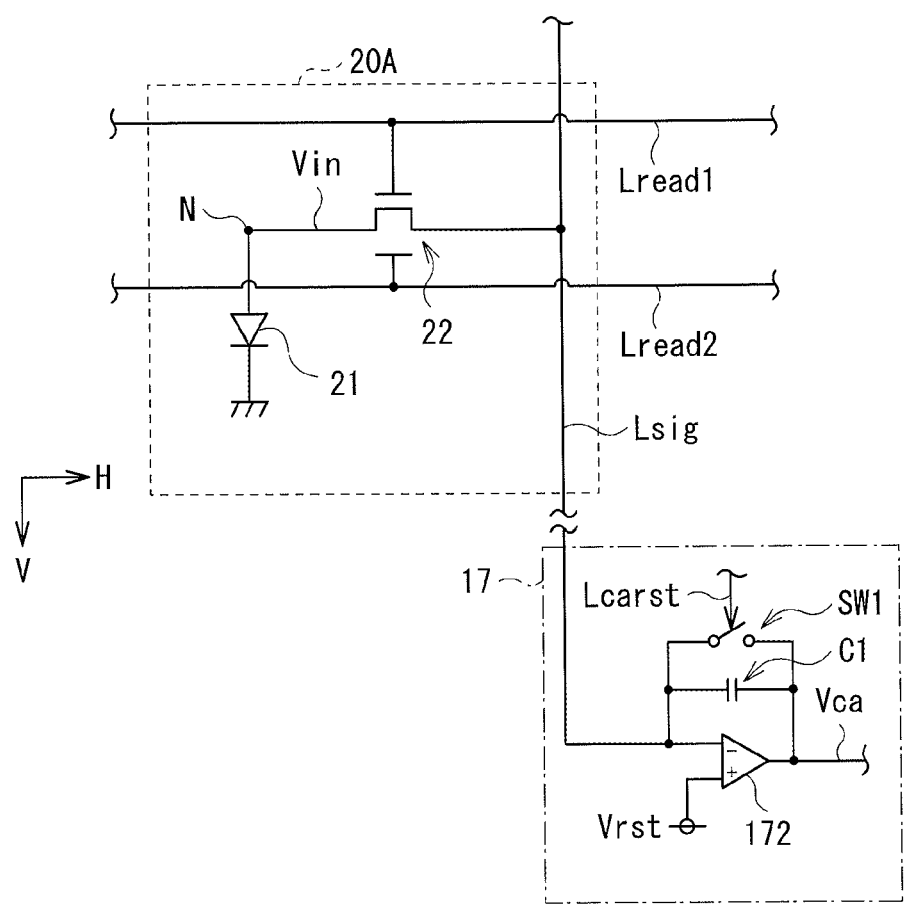
FIG. 28 is a circuit diagram illustrating a configuration of a pixel and the like according to Modification 6.

FIG. 28 illustrates a circuit structure of a pixel (a pixel 20A) according to Modification 6 with a circuit structure example of the column selection section 17. The pixel 20A in this modification has a so-called passive circuit structure as in the case of the pixel 20 in the embodiment, and includes one photoelectric transducer 21 and one transistor 22. Moreover, the read control lines Lread1 and Lread2 extending along the H direction and the signal line Lsig extending along the V direction are connected to the pixel 20A.

However, in the pixel 20A in this modification, unlike the pixel 20 in the above-described embodiment, an anode of the photoelectric transducer 21 is connected to the storage node N, and a cathode of the photoelectric transducer 21 is connected to a ground. Thus, in the pixel 20A, the storage node N may be connected to the anode of the photoelectric transducer 21, and in such a configuration, effects similar to those in the image pickup unit 1 according to the above-described embodiment are obtained.

(Modification 7)

Figure 29:
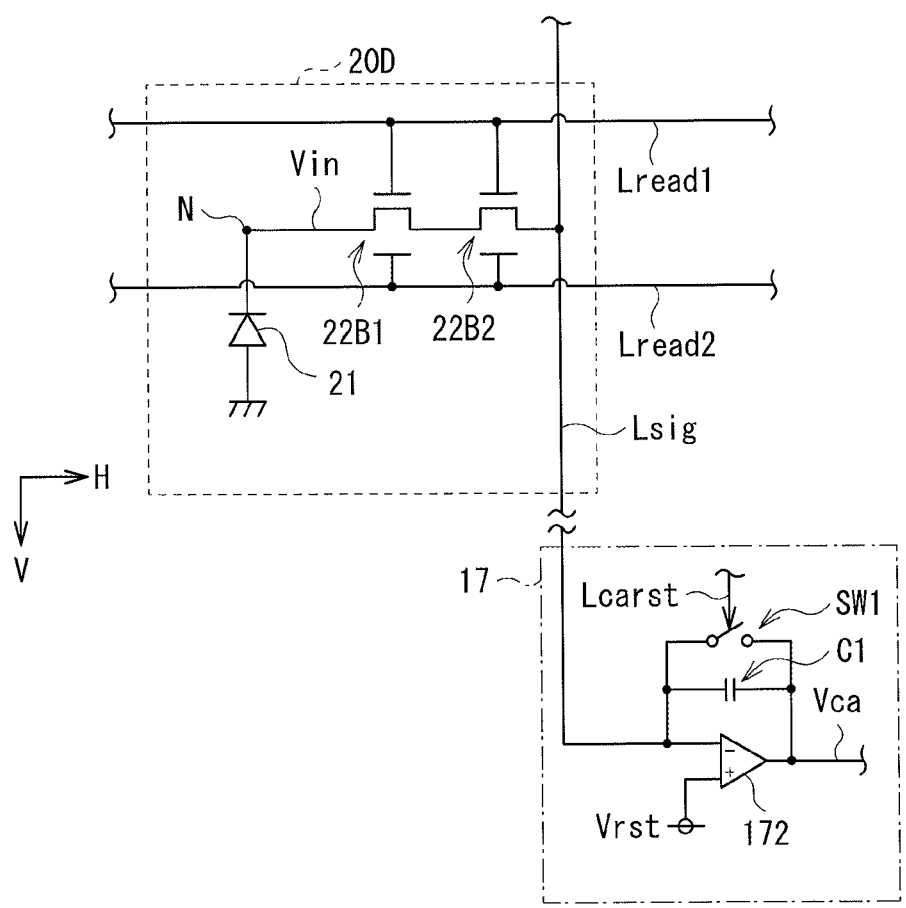
FIG. 29 is a circuit diagram illustrating a configuration of a pixel and the like according to Modification 7.

FIG. 29 illustrates a circuit structure of a pixel (a pixel 20D) according to Modification 7 with a circuit structure example of the column selection section 17 described in the above-described embodiment. The pixel 20D in this modification has a so-called passive circuit structure as in the case of the pixel 20 in the embodiment, and includes one photoelectric transducer 21, and is connected to the read control lines Lread1 and Lread2 extending along the H direction and the signal line Lsig extending along the V direction.

However, in this modification, the pixel 20D includes two transistors (transistors 22B1 and 22B2). The two transistors 22B1 and 22B2 are connected in series to each other (a source or a drain of one of the transistors 22B1 and 22B2 is electrically connected to a source or a drain of the other transistor, or as will be described later, the semiconductor layers 226 of the transistors 22B1 and 22B2 are integrally formed). Moreover, one gate of each of the transistors 22B1 and 22B2 is connected to the read control line Lread1, and the other gate of each of the transistors 22B1 and 22B2 is connected to the read control line Lread2.

Figure 30:
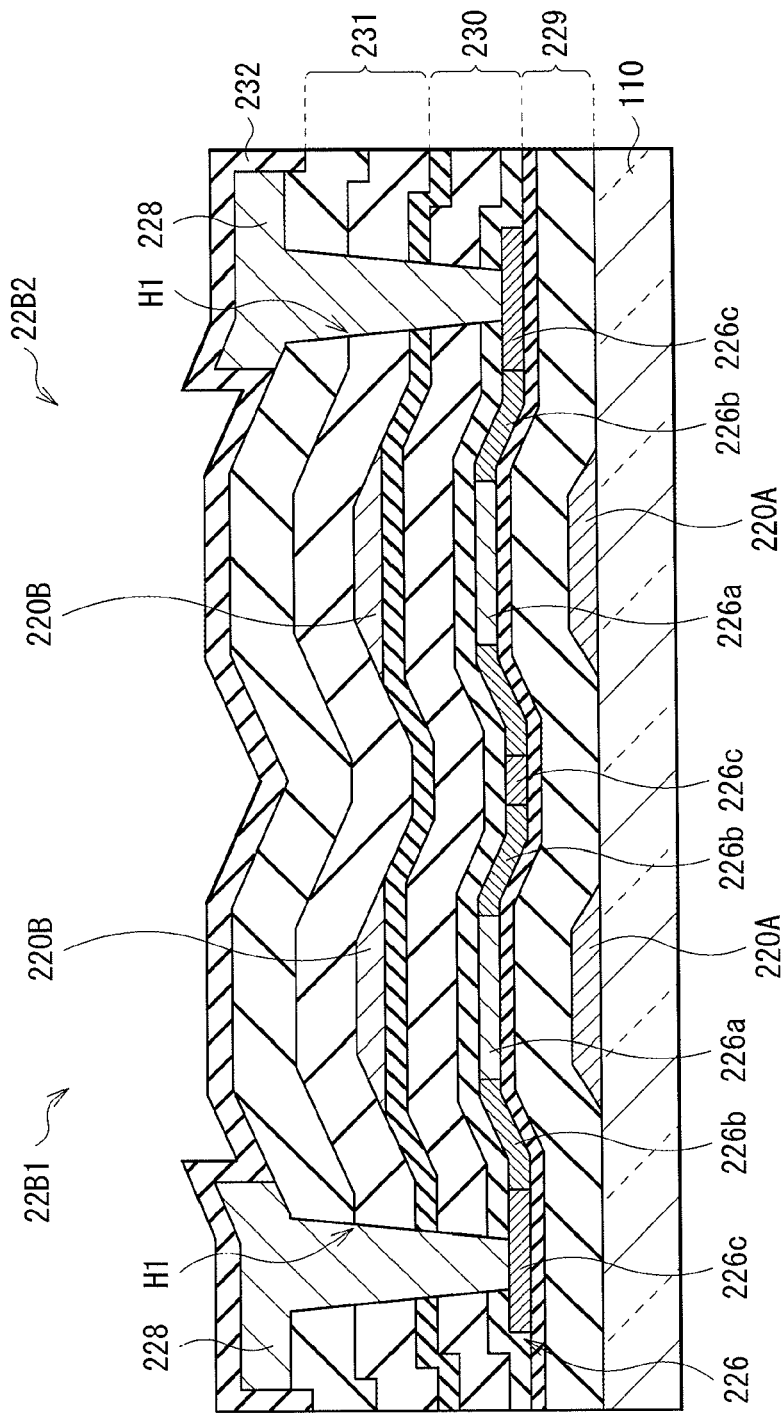
FIG. 30 is a sectional view illustrating a specific configuration of two transistors illustrated in FIG. 28.

FIG. 30 illustrates a sectional configuration example of such two transistors 22B1 and 22B2. As illustrated in FIG. 30, two laminate configurations in which the semiconductor layer 226 is sandwiched between two gate electrodes 220A and 220B are formed side by side, and a pair of source-drain electrodes 228 are disposed on both sides of a combination of the two laminate configurations. It is to be noted that, in this example, the semiconductor layers 226 of the transistors 22B1 and 22B2 are integrally formed. More specifically, two first gate electrodes 220A are included in selective regions on the substrate 110, and the first gate insulating film 229 and the semiconductor layer 226 are disposed over these first gate electrodes 220A. The second gate insulating film 230 is formed on the semiconductor layer 226, and the second gate electrodes 220B are disposed in selective regions (regions corresponding to the two first gate electrodes 220A) on the second gate insulating film 230. The first interlayer insulating film 231 is formed over these second gate electrodes 220B, and the pair of source-drain electrodes 228 are disposed to fill in the contact holes H1. The second interlayer insulating film 232 is disposed on the source-drain electrodes 228 to cover two transistors 22B1 and 22B2. It is to be noted that, when the gate electrodes are disposed side by side as in the case of this modification, off leakage (a leakage current at Vg=0 V) is reduced.

Thus, two transistors 22B1 and 22B2 connected in series to each other may be included in the pixel 20D, and in this case, when the above-described read operation and the above-described reset operation are performed, variations in the potential Vn caused by charge injection are suppressed. It is to be noted that three or more transistors may be connected in series to one another.

(Modifications 8 and 9)

Figure 31:
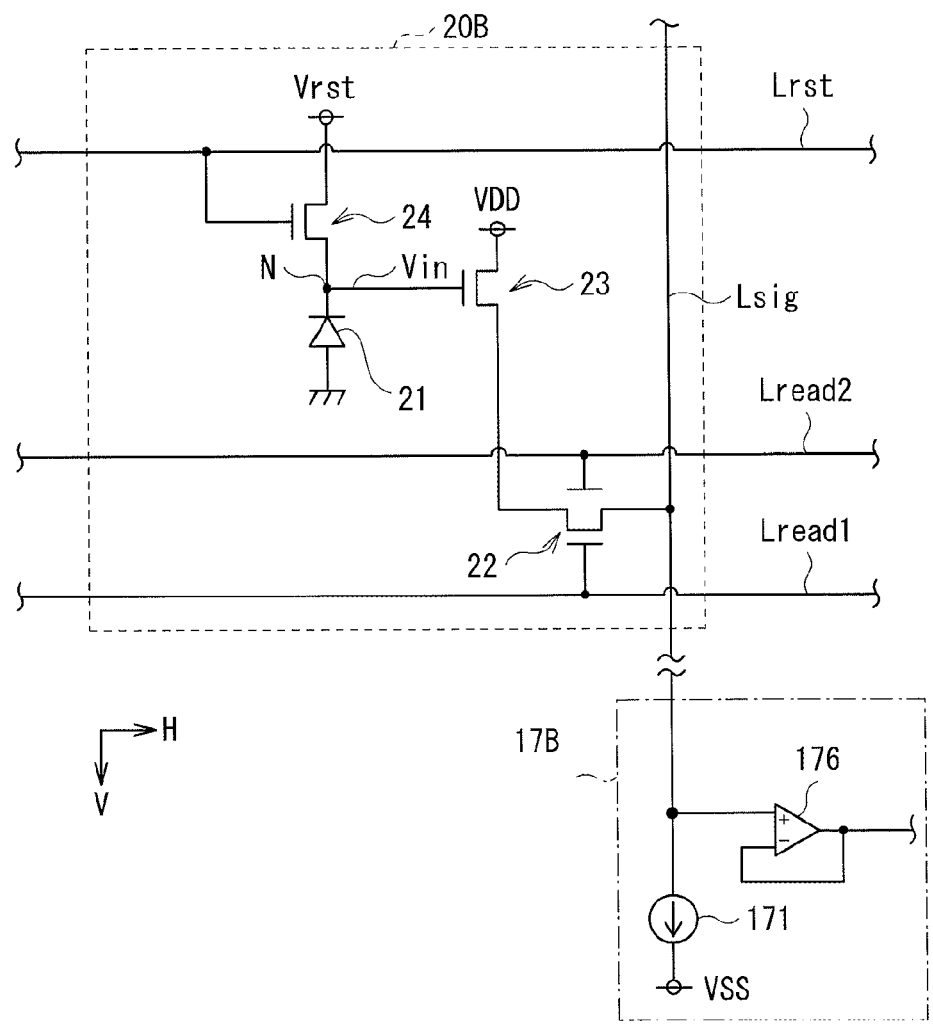
FIG. 31 is a circuit diagram illustrating a configuration of a pixel and the like according to Modification 8.
Figure 32:
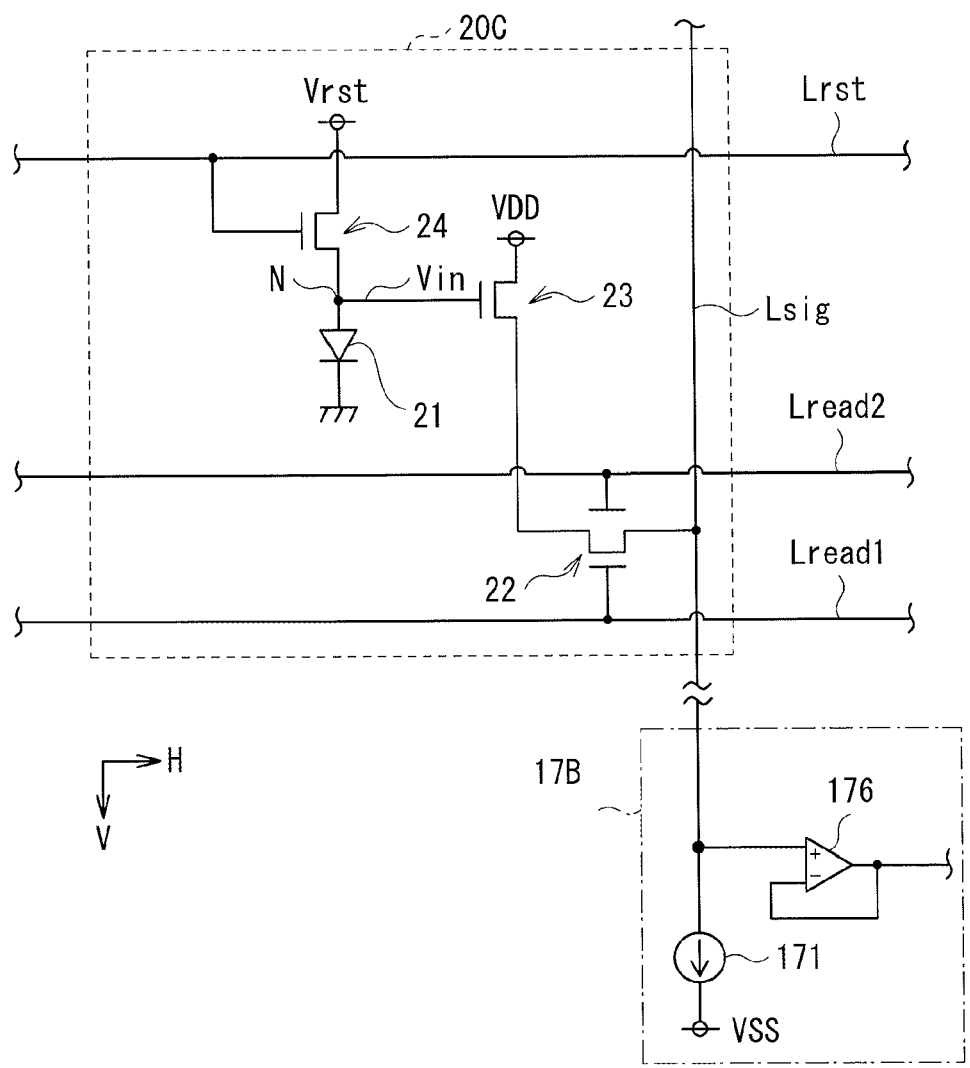
FIG. 32 is a circuit diagram illustrating a configuration of a pixel and the like according to Modification 9.

FIG. 31 illustrates a circuit structure of a pixel (a pixel 20B) according to Modification 8 with a circuit structure example of a column selection section 17B which will be described below. Moreover, FIG. 32 illustrates a circuit structure of a pixel (a pixel 20C) according to Modification 9 with the circuit structure example of the column selection section 17B. Unlike the pixels 20 and 20A, the pixels 20B and 20C according to Modifications 8 and 9 each have a so-called active pixel circuit.

The active pixels 20B and 20C each include one photoelectric transducer 21 and three transistors 22, 23, and 24. The read control lines Lread1 and Lread2 and the reset control line Lrst extending along the H direction and the signal line Lsig extending along the V direction are connected to each of the pixels 20B and 20C.

In each of the pixels 20B and 20C, one gate of the transistor 22 is connected to the read control line Lread1, and other gate of the transistor 22 is connected to the read control line Lread2, and a source of the transistor 22 is connected to the signal line Lsig, and a drain of the transistor 22 is connected to a drain of the transistor 23 forming a source follower circuit. A source of the transistor 23 is connected to a power supply VDD, and a gate of the transistor 23 is connected to a cathode (an example in FIG. 31) or an anode (an example in FIG. 32) of the photoelectric transducer 21 and a drain of the transistor 24 functioning as a reset transistor through the storage node N. A gate of the transistor 24 is connected to the reset control line Lrst, and the reset voltage Vrst is applied to a source of the transistor 24. In Modification 8 in FIG. 31, the anode of the photoelectric transducer 21 is connected to a ground, and in Modification 9 in FIG. 32, the cathode of the photoelectric transducer 21 is connected to the ground.

Moreover, in Modifications 8 and 9, the column selection section 17B includes a constant current source 171 and an amplifier 176, instead of the charge amplifier 172, the capacitor C1, and the switch SW1 of the above-described column selection section 17. In the amplifier 176, the signal line Lsig is connected to a positive-side input terminal, and a negative-side input terminal and an output terminal are connected to each other to form a voltage follower circuit. It is to be noted that one terminal of the constant current source 171 is connected to an end of the signal line Lsig, and a power supply VSS is connected to the other terminal of the constant current source 171.

In an image pickup unit including the pixels 20B or 20C having such an active circuit structure, the potential Vn of the storage node N varies (falls, for example) by charge injection in the reset operation. Therefore, in Modifications 8 and 9, as in the case of the above-described embodiment, when a reset operation is performed with use of predetermined timings or predetermined amplitudes, charge injection is reduced, and higher image quality of a picked-up image is achievable. However, an image pickup operation (a line-sequential image pickup operation) is performed on the pixels 20B and 20C having the active circuit structure in the following manner.

Figure 33:
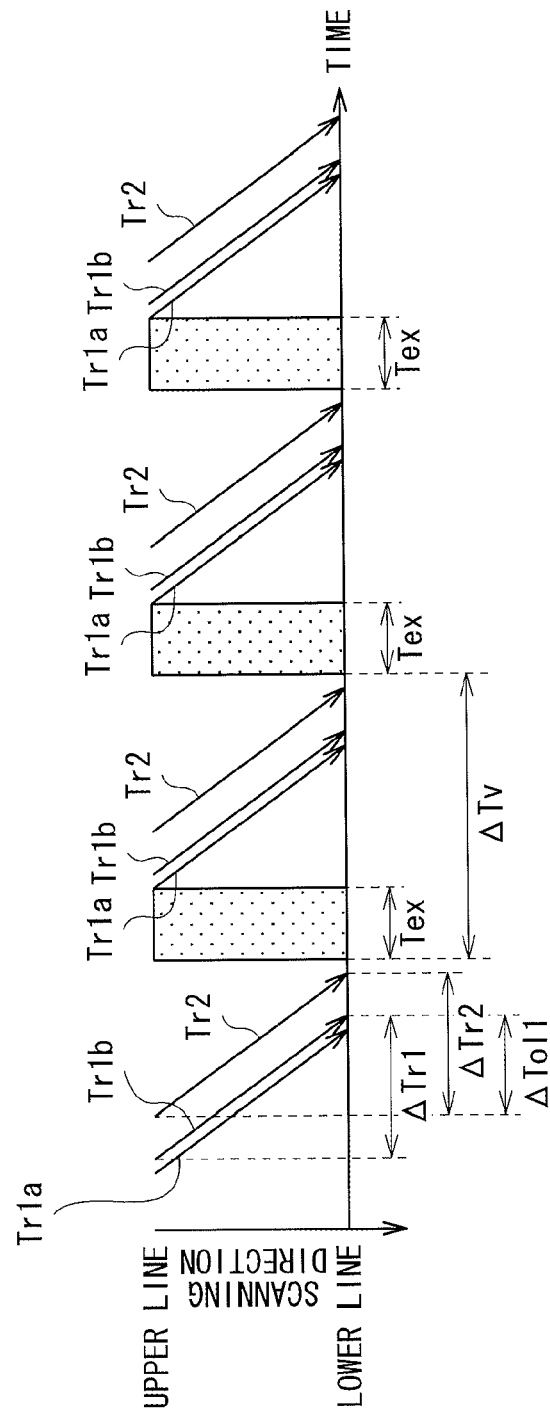
FIG. 33 is a timing chart illustrating an example of a line-sequential image pickup operation in an active pixel circuit.

For example, as illustrated in FIG. 33, a line-sequential read operation and a plurality of (two in this case) line-sequential reset operations are performed independently of one another (intermittently). More specifically, a line-sequential read operation for performing a line-sequential operation in a read period Tr1a, a first line-sequential reset operation for performing a line-sequential operation in a first reset period (a first reset period Tr1b), and a second line-sequential reset operation for performing a line-sequential operation in a second reset period (a second reset period Tr2) are performed independently of one another. It is to be noted that, in the case of the active circuit structure, each reset operation is performed through switching the transistor 24 as a reset transistor into the on state.

(Modifications 10 and 11)

Figure 34:
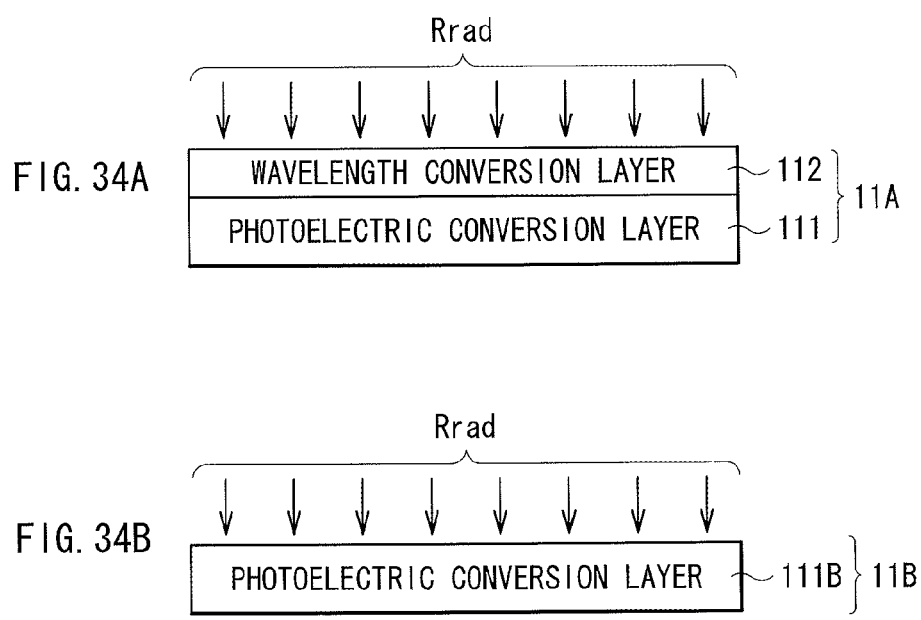
FIGS. 34A and 34B are schematic views illustrating a schematic configuration of an image pickup section according to Modification 10 and a schematic configuration of an image pickup section according to Modification 11, respectively.

FIGS. 34A and 34B schematically illustrate schematic configurations of image pickup sections (image pickup sections 11A and 11B) according to Modifications 10 and 11, respectively.

The image pickup section 11A according to Modification 10 illustrated in FIG. 34A further includes a wavelength conversion layer 112 on the photoelectric conversion layer 111 (located closer to a light reception surface) described in the above-described embodiment. The wavelength conversion layer 112 converts a wavelength of a radiation ray Rrad (an α-ray, a β-ray, a γ-ray, an X-ray, or the like) into a wavelength within a sensitivity range of the photoelectric conversion layer 111, thereby allowing the photoelectric conversion layer 111 to read information based on the radiation ray Rrad. The wavelength conversion layer 112 is made of a phosphor (for example, a scintillator) converting a radiation ray such as an X-ray into visible light. Such a wavelength conversion layer 112 is formed through laminating, for example, an organic planarization film, a planarization film made of a spin-on glass material or the like, and a phosphor film in this order. The phosphor film is made of, for example, CsI:Tl, $Gd_2O_2S$, BaFX (where X is Cl, Br, I, or the like), NaI, or $CaF_2$. The image pickup section 11A is applied to, for example, a so-called indirect conversion type radiation image pickup unit.

Unlike the above-described embodiment, the image pickup section 11B according to Modification 11 illustrated in FIG. 34B includes a photoelectric conversion layer 111B absorbing an incident radiation ray Rrad, and converting the radiation ray Rrad into an electrical signal. The photoelectric conversion layer 111B is made of, for example, an amorphous selenium (a-Se) semiconductor, or a cadmium-tellurium (CdTe) semiconductor. The image pickup section 11B is applied to, for example, a so-called direct conversion type radiation image pickup unit. It is to be noted that the pixel 20 in the direct conversion type radiation image pickup unit has a circuit structure including respective components illustrated in FIG. 3, except that the photoelectric transducer 21 is replaced with a capacitor.

The image pickup unit including one of the image pickup sections 11A and 11B according to Modifications 10 and 11 is used as various kinds of radiation image pickup units obtaining electrical signal based on the incident radiation ray Rrad. The radiation image pickup unit is applicable to, for example, a medical X-ray image pickup unit (such as a digital radiography system) or an X-ray radiography system for baggage inspection used in airports and the like, an industrial X-ray image pickup unit (for example, a unit performing inspections on dangerous goods or the like in containers, or inspections in bags and the like).

APPLICATION EXAMPLE

Next, the image pickup unit according to any one of the above-described embodiment and the modifications (Modifications 1 to 11) thereof is applicable to an image pickup display system which will be described below.

Figure 35:
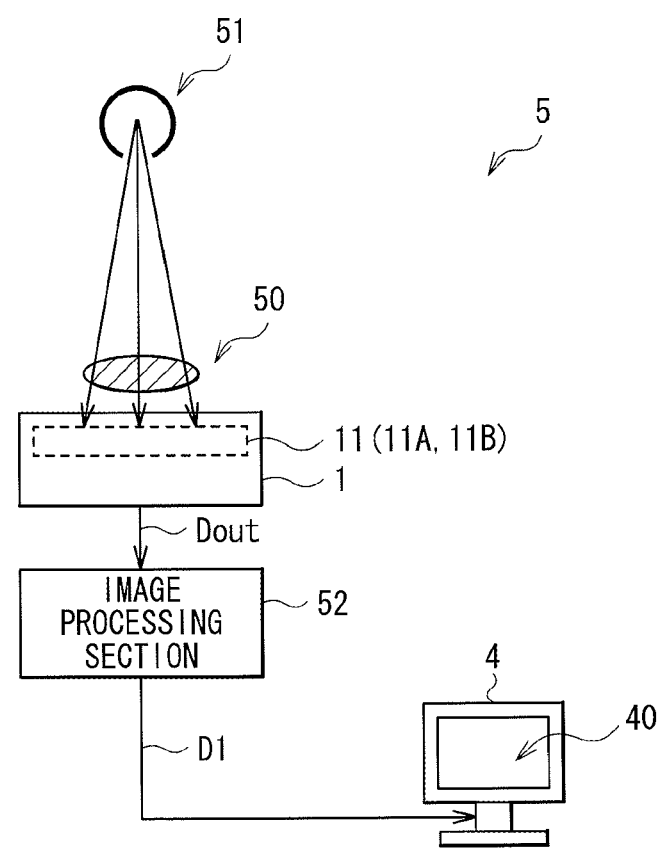
FIG. 35 is a schematic view illustrating a schematic configuration of an image pickup display system according to an application example.

FIG. 35 schematically illustrates a schematic configuration example of the image pickup display system (an image pickup display system 5) according to an application example. The image pickup display system 5 includes the image pickup unit 1 having the image pickup section 11 (or 11A or 11B) and the like according to the above-described embodiment or the like, an image processing section 52, and a display unit 4, and is configured as an image pickup display system (a radiation image pickup display system) using radiation rays in this example.

The image processing section 52 performs predetermined image processing on the output data Dout (the image pickup signal) output from the image pickup unit 1 to generate image data D1. The display unit 4 displays, on a predetermined monitor screen 40, an image based on the image data D1 generated in the image processing section 52.

In the image pickup display system 5, the image pickup unit 1 (a radiation image pickup unit in this case) acquires image data Dout of an object 50 based on irradiation light (radiation rays in this case) applied to the object 50 from a light source (a radiation source such as an X-ray source in this case) 51, and then outputs the image data Dout to the image processing section 52. The image processing section 52 performs the above-described predetermined image processing on the input image data Dout to output resultant image data (display data) D1 to the display unit 4. The display unit 4 displays, on the monitor screen 40, image information (a picked-up image) based on the input image data D1.

Thus, in the image pickup display system 5 according to the application example, an image of the object 50 is acquired as an electrical signal in the image pickup unit 1; therefore, the acquired electrical signal is transmitted to the display unit 4 to display an image. In other words, the image of the object 50 is observed without using a radiography film in related art, and the image pickup display system 5 is capable of taking and displaying moving images.

It is to be noted that, in the application example, the image pickup unit 1 is configured as the radiation image pickup unit, and the image pickup display system using radiation rays is described as an example. However, the image pickup display system of the present disclosure is applicable to image pickup display systems using other types of image pickup units.

Although the present disclosure is described referring to the embodiment, modifications thereof, and application examples thereof, the disclosure is not limited thereto, and may be variously modified. For example, the circuit structure of the pixel in the image pickup section is not limited to those (the circuit structures of the pixels 20, and 20A to 20D) described in the above-described embodiment and the like, and the pixel may have any other circuit structure. Likewise, the circuit structures of the row scanning section, the column selection section, and the like are not limited to those described in the above-described embodiment and the like, and the row scanning section, the column selection section, and the like may have any other circuit structure.

Moreover, the potential Vread1 and the potential Vread2 described in the above-described embodiment and the like may be applied to either of two gate electrodes in the transistor. Further, the case where the timing of switching the potential Vread2 from the on-potential to the off-potential or the amplitude of the potential Vread2 is adjusted is described above as an example; however, the timing of switching the potential Vread1 or the amplitude of the potential Vread1 may be adjusted, or the timings of switching the potentials Vread1 and Vread2 and the amplitudes of the potential Vread1 and Vread2 may be adjusted. In the case where the potentials Vread1 and Vread2 are adjusted to have amplitudes different from each other, switching between two values or three values is performed. However, switching between four or more values may be performed. Moreover, in addition to the timing of switching from the on-potential to the off-potential (a potential falling timing), a timing of switching from the off-potential to the on-potential (a potential rising timing) may be adjusted. For example, one gate potential may rise and fall earlier than the other gate potential. In other words, in the present disclosure, it is only necessary to perform an operation while adjusting the timings of switching the gate potentials between an on-voltage and an off-voltage, the on-voltage value of the gate potentials, or both thereof. However, as in the case of the above-described embodiment and the like, it is desirable that one gate potential fall earlier than the other gate potential, thereby more effectively obtaining an effect of reducing charge injection.

Further, in the above-described embodiment and the like, the case where a plurality of reset operations (including the reset operation performed along with the read operation when the passive drive circuit is used) are performed in one frame period is described as an example; however, the present disclosure is applicable to the case where only one reset operation is performed in one frame period.

It is to be noted that, in the case where the active circuit structure is used, the read operation and the reset operation are performed independently of each other, as described above; therefore, the timing of the reset operation following the read operation is adjustable.

Further, the image pickup section, the row scanning section, the A/D conversion section (the column selection section), the column scanning section, and the like may be formed on, for example, one and the same substrate. More specifically, for example, when a polycrystalline semiconductor such as a low-temperature polycrystalline silicon is used, a switch and the like in these circuit parts are formed on the same substrate. Therefore, a drive operation is performed on the same substrate, based on, for example, a control signal from an external system control section, and a reduction in bezel width (in a bezel with three free edges) or an improvement in reliability in wiring connection is achievable accordingly.

It is to be noted that the present disclosure is allowed to have the following configurations.

(1) An image pickup unit including:

an image pickup section including a plurality of pixels, the pixels each including a photoelectric transducer and a field-effect transistor; and a drive section switching the transistor between an on operation and an off operation to perform a read operation and a reset operation of a signal charge accumulated in each of the pixels, in which the transistor includes a first gate electrode and a second gate electrode with a semiconductor layer in between, the drive section applies a first voltage and a second voltage to the first gate electrode and the second gate electrode of the transistor, respectively, to switch the transistor between the on operation and the off operation, and the drive section adjusts timings of switching the first and second voltages between an on-voltage and an off-voltage, on-voltage values of the first and second voltages, or both thereof to be different from each other.

(2) The image pickup unit according to (1), in which the drive section performs the reset operation while maintaining the first voltage at the on-voltage and maintaining the second voltage at the off-voltage.

(3) The image pickup unit according to (1) or (2), in which the drive section performs the reset operation while adjusting a timing of switching the second voltage from the on-voltage to the off-voltage to be earlier than that of switching the first voltage from the on-voltage to the off-voltage.

(4) The image pickup unit according to any one of (1) to (3), in which the drive section performs the reset operation while adjusting the on-voltage value of the second voltage to be smaller than that of the first voltage.

(5) The image pickup unit according to any one of (1) to (4), in which the drive section performs the reset operation while adjusting a timing of switching the second voltage from the on-voltage to the off-voltage to be earlier than that of switching the first voltage from the on-voltage to the off-voltage and adjusting the on-voltage value of the second voltage to be smaller than that of the first voltage.

(6) The image pickup unit according to any one of (1) to (5), in which the drive section intermittently performs a plurality of reset operations in one frame period, and the drive section adjusts the timings of switching the first and second voltages, the on-voltage values of the first and second voltages, or both thereof to be different from each other in a last reset operation in the one frame period, or the last reset operation and one or more other reset operations in the one frame period.

(7) The image pickup unit according to any one of (1) to (6), in which the signal charge in each of the pixels is reset during the read operation by the drive section.

(8) The image pickup unit according to any one of (1) to (7), in which gate lengths of the first and second gate electrodes in the transistor are different from each other.

(9) The image pickup unit according to (8), in which the transistor includes a pair of source-drain electrodes each being electrically connected to the semiconductor layer and functioning as a source or a drain, the semiconductor layer includes an active layer and an LDD (Lightly Doped Drain) layer formed between the active layer and each of the pair of source-drain electrodes, and one or both of the first and second gate electrodes overlap the LDD layer formed closer to one of the source-drain electrodes.

(10) The image pickup unit according to (9), in which the second gate electrode overlaps the LDD layer formed closer to one of the source-drain electrode.

(11) The image pickup unit according to any one of (1) to (10), in which the photoelectric transducer is configured of a PIN photodiode or an MIS sensor.

(12) The image pickup unit according to any one of (1) to (11), in which the image pickup section generates an electrical signal based on an incident radiation ray.

(13) The image pickup unit according to (12), in which the image pickup section includes a wavelength conversion layer on the photoelectric transducer, the wavelength conversion layer converting a wavelength of a radiation ray into a wavelength within a sensitivity range of the photoelectric transducer.

(14) The image pickup unit according to (12), in which the image pickup section includes a photoelectric conversion layer absorbing an incident radiation ray and then converting the radiation ray into an electrical signal.

(15) The image pickup unit according to any one of (12) to (14), in which the radiation ray is an X-ray. (16) The image pickup unit according to any one of (1) to (15), in which the semiconductor layer of the transistor is made of amorphous silicon, polycrystalline silicon, microcrystalline silicon, or an oxide semiconductor.

(17) An image pickup display system including an image pickup unit, and a display unit displaying an image based on an image pickup signal acquired by the image pickup unit, the image pickup unit including:

an image pickup section including a plurality of pixels, the pixels each including a photoelectric transducer and a field-effect transistor; and a drive section switching the transistor between an on operation and an off operation to perform a read operation and a reset operation of a signal charge accumulated in each of the pixels, in which the transistor includes a first gate electrode and a second gate electrode with a semiconductor layer in between, the drive section applies a first voltage and a second voltage to the first gate electrode and the second gate electrode of the transistor, respectively, to switch the transistor between the on operation and the off operation, and the drive section adjusts timings of switching the first and second voltages between an on-voltage and an off-voltage, on-voltage values of the first and second voltages, or both thereof to be different from each other.

The present application contains subject matter related to that disclosed in Japanese Priority Patent Application No. 2011-231768 filed in the Japan Patent Office on Oct. 21, 2011, the entire content of which is hereby incorporated by reference.

It should be understood by those skilled in the art that various modifications, combinations, sub-combinations, and alterations may occur depending on design requirements and other factors insofar as they are within the scope of the appended claims or the equivalents thereof.

What is claimed is:

1. An image pickup unit comprising:

an image pickup section including a plurality of pixels, at least one pixel including a photoelectric transducer and a field-effect transistor; and a drive section configured to switch the transistor between an on operation and an off operation to perform a read operation and a reset operation of a signal charge accumulated in the at least one pixel, wherein the transistor includes a first gate electrode and a second gate electrode with a semiconductor layer in between, the drive section is further configured to apply a first voltage to the first gate electrode of the transistor and a second voltage to the second gate electrode of the same transistor, respectively, to switch the transistor between the on operation and the off operation, and the drive section is configured to set timings of switching the first and second voltages between an on-voltage and an off-voltage, set on-voltage values of the first and second voltages, or set both thereof to be different from each other.

2. The image pickup unit according to claim 1, wherein the drive section is configured to perform a second the reset operation as part of the reset operation for the at least one pixel by maintaining the first voltage at the on-voltage and maintaining the second voltage at the off-voltage.

3. The image pickup unit according to claim 1, wherein the drive section is configured to perform a second reset operation as part of the reset operation for the at least one pixel by switching the second voltage from the on-voltage to the off-voltage earlier than switching the first voltage from the on-voltage to the off-voltage.

4. The image pickup unit according to claim 1, wherein the drive section is configured to perform a second reset operation as part of the reset operation for the at least one pixel by setting the on-voltage value of the second voltage to be smaller than that of the first voltage.

5. The image pickup unit according to claim 1, wherein the drive section is configured to perform a second reset operation as part of the reset operation for the at least one pixel by switching the second voltage from the on-voltage to the off-voltage earlier than switching the first voltage from the on-voltage to the off-voltage and by setting the on-voltage value of the second voltage to be smaller than that of the first voltage.

6. The image pickup unit according to claim 1, wherein
the drive section is further configured to intermittently perform a plurality of reset operations for the at least one pixel in one frame period, and
the drive section is configured to set the timings of switching the first and second voltages, set the on-voltage values of the first and second voltages, or set both thereof to be different from each other in a last reset operation in the one frame period, or the last reset operation and one or more other reset operations in the one frame period.

7. The image pickup unit according to claim 1, wherein the signal charge in each of the pixels is reset during the read operation by the drive section.

8. The image pickup unit according to claim 1, wherein gate lengths of the first and second gate electrodes in the transistor are different from each other.

9. The image pickup unit according to claim 8, wherein
the transistor includes a pair of source-drain electrodes each being electrically connected to the semiconductor layer and functioning as a source or a drain,
the semiconductor layer includes an active layer and an LDD (Lightly Doped Drain) layer formed between the active layer and each of the pair of source-drain electrodes, and
one or both of the first and second gate electrodes overlap the LDD layer formed closer to one of the source-drain electrodes.

10. The image pickup unit according to claim 9, wherein the second gate electrode overlaps the LDD layer formed closer to one of the source-drain electrode.

11. The image pickup unit according to claim 1, wherein the photoelectric transducer comprises a PIN photodiode or an MIS sensor.

12. The image pickup unit according to claim 1, wherein the the at least one pixel is configured to generate an electrical signal based on an incident radiation ray.

13. The image pickup unit according to claim 12, wherein the image pickup section includes a wavelength conversion layer on the photoelectric transducer, the wavelength conversion layer converting a wavelength of a radiation ray into a wavelength within a sensitivity range of the photoelectric transducer.

14. The image pickup unit according to claim 12, wherein the image pickup section includes a photoelectric conversion layer absorbing an incident radiation ray and then converting the radiation ray into an electrical signal.

15. The image pickup unit according to claim 12, wherein the radiation ray is an X-ray.

16. The image pickup unit according to claim 1, wherein the semiconductor layer of the transistor is made of amorphous silicon, polycrystalline silicon, microcrystalline silicon, or an oxide semiconductor.

17. An image pickup display system including an image pickup unit, and a display unit displaying an image based on an image pickup signal acquired by the image pickup unit, the image pickup unit comprising:
an image pickup section including a plurality of pixels, at least one pixel including a photoelectric transducer and a field-effect transistor; and
a drive section configured to switch the transistor between an on operation and an off operation to perform a read operation and a reset operation of a signal charge accumulated in the at least one pixel,
wherein the transistor includes a first gate electrode and a second gate electrode with a semiconductor layer in between,
the drive section is further configured to apply a first voltage to the first gate electrode of the transistor and a second voltage to the second gate electrode of the same transistor, respectively, to switch the transistor between the on operation and the off operation, and
the drive section is configured to set timings of switching the first and second voltages between an on-voltage and an off-voltage to be different from each other, set on-voltage values of the first and second voltages to be different from each other, or set both thereof to be different from each other for at least a portion of the reset operation.

18. The image pickup system of claim 17, wherein the drive section is configured to set the timings of switching, set the on-voltage values, or set both thereof to be the same for a first reset operation of the reset operation for the at least one pixel.

19. The image pickup display system of claim 17, wherein the drive section is configured to perform a second reset operation as part of the reset operation for the at least one pixel by maintaining the first voltage at the on-voltage and maintaining the second voltage at the off-voltage.

* * * * *